(12) United States Patent
Suzuki et al.

(10) Patent No.: US 8,023,754 B2
(45) Date of Patent: *Sep. 20, 2011

(54) IMAGE ENCODING AND DECODING APPARATUS, PROGRAM AND METHOD

(75) Inventors: Yoshinori Suzuki, Saitama (JP); Choong Seng Boon, Yokohama (JP); Thiow Keng Tan, Singapore (SG)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/614,819

(22) Filed: Nov. 9, 2009

(65) Prior Publication Data

US 2010/0054338 A1    Mar. 4, 2010

Related U.S. Application Data

(63) Continuation of application No. 11/281,553, filed on Nov. 18, 2005, now Pat. No. 7,643,690.

(30) Foreign Application Priority Data

Nov. 19, 2004  (JP) ................................ 2004-336463
Oct. 13, 2005  (JP) ................................ 2005-299326

(51) Int. Cl.
*G06K 9/36*  (2006.01)

(52) U.S. Cl. .......................... 382/236; 382/233; 382/232

(58) Field of Classification Search .................. 382/232, 382/233, 236, 243; 375/E7.138, E7.171, 375/240.02, 240.16, 240.15, 240.08, 240.25; 348/390.1, 699

See application file for complete search history.

(56) References Cited

U.S. PATENT DOCUMENTS

| 5,677,735 | A | 10/1997 | Ueno et al. ............... 375/240.15 |
| 5,883,678 | A | 3/1999 | Yamaguchi et al. ........ 348/390.1 |
| 6,088,486 | A | 7/2000 | Yamaguchi et al. .......... 382/243 |
| 6,130,913 | A | 10/2000 | Yamaguchi et al. ..... 375/240.25 |
| 6,330,280 | B1 | 12/2001 | Suzuki et al. ............. 375/240.08 |
| 6,510,177 | B1 | 1/2003 | De Bonet et al. ........ 375/240.16 |
| 6,560,282 | B2 | 5/2003 | Tahara et al. ............ 375/240.02 |
| 7,317,839 | B2 | 1/2008 | Holcomb ...................... 382/236 |

(Continued)

FOREIGN PATENT DOCUMENTS

JP          1-228384          9/1989

(Continued)

OTHER PUBLICATIONS

C. Andrew Segall, et al., "High-Resolution Images from Low-Resolution Compressed Video", IEEE Signal Processing Magazine, May 2003, pp. 37-48.

(Continued)

*Primary Examiner* — Anh Hong Do
(74) *Attorney, Agent, or Firm* — Oblon, Spivak, McClelland, Maier & Neustadt, L.L.P.

(57) ABSTRACT

An image decoding apparatus has a video data decoder for receiving and decoding encoded video data to acquire a plurality of reconstructed images; a subsidiary data decoder for receiving and decoding subsidiary data to acquire subsidiary motion information; and a resolution enhancer for generating motion vectors representing time-space correspondences between the plurality of reconstructed images, based on the subsidiary motion information acquired by the subsidiary data decoder, and for generating a high-resolution image with a spatial resolution higher than that of the plurality of reconstructed images, using the generated motion vectors and the plurality of reconstructed images acquired by the video data decoder.

10 Claims, 22 Drawing Sheets

U.S. PATENT DOCUMENTS

| | | | |
|---|---|---|---|
| 7,499,493 B2* | 3/2009 | Linzer | 375/240.16 |
| 2002/0044604 A1 | 4/2002 | Nieweglowski et al. | 375/240.03 |

FOREIGN PATENT DOCUMENTS

| | | |
|---|---|---|
| JP | 9-182032 | 7/1997 |
| JP | 2934151 | 5/1999 |
| JP | 3271369 | 1/2002 |
| WO | WO 01/47277 A1 | 6/2001 |
| WO | WO 03/036980 A1 | 5/2003 |

OTHER PUBLICATIONS

Hu He, et al., "MAP Based Resolution Enhancement of Video Sequences Using a Huber-Markov Random Field Image Prior Model"., Proceedings od IEEE International Conference on Image Processing, vol. II, Sep. 2003, 4 pages.

"MPEG-4 Video Verification Model version 18.0, International Organisation for Standardisation, Coding of Moving Pictures and Audio", Video, Output Document of MPEG PISA Meeting, Jan. 2001, pp. 20-101 and 236-266.

Jens-RAiner Ohm, et al., "Text of 14496-2 Third Edition, Information Technology-Coding of Audio-Visual Objects-Part 2:Visual", Mar. 2003, pp. 240-320.

"Text of ISO/IEC 14496 10 Advanced Video Coding $3^{rd}$ Edition", Joint Video Team (JVT) of ISO/IEC MPEG &ITU-T VCEG, Jul. 2004, pp. 20-21, 103-113, 145-151, and 199-240.

Sung Cheol Park, et al., "Super-Resolution Image Reconstruction: A Technical Overview", IEEE Signal-Processing Magazine, May 2003, pp. 21-36.

A. Murat Tekalp, et al., "High-Resolution Image Reconstruction From Lower-Resolution Image Sequences and Space-Varying Image Restoration", Proceedings Oof IEEE International Conference Acoustics, Speech and Signal Processing, vol. 3, Mar. 1992, pp. 169-172.

Gustavo M. Callicó, et al., "A Low-Cost Implementation of Super-Resolution based on a Video Encoder", IEEE, XP010632917, vol. 2, Nov. 5, 2002, pp. 1439-1444.

Gustavo Marrero Callicó, et al., "Mapping of Real-Time and Low-Cost Super-Resolution Algorithms onto a Hybrid Video Encoder", Proceedings of SPIE, XP002498529, vol. 5117, May 19, 2003 pp. 42-52.

Aljoscha Smolić, et al., "Improved Video Coding Using Long-Term Global Motion Compensation", Processing of SPIE—IS&T Electronic Imaging, XP008046986, vol. 5308, No. 1, Jan. 22, 2004, pp. 343-354.

Andrew J. Patti, et al., "High-Resolution Image Reconstruction From a Low-Resolution Image Sequence in the Presence of Time-Varying Motion Blur", IEEE, XP010146050, vol. 1, Nov. 13, 1994, pp. 343-347.

Office Action issued Sep. 21, 2010, in Japan Patent Application No. 2005-299326.

Office Action issued Mar. 8, 2011, in China Patent Application No. 201010113362.3 (with English translation).

* cited by examiner

IMAGE ENCODING AND DECODING APPARATUS, PROGRAM AND METHOD

CROSS-REFERENCE TO RELATED APPLICATIONS

The present continuation application claims the benefit of priority under 35 U.S.C. §120 from U.S. application Ser. No. 11/281,553, filed Nov. 18, 2005, now U.S. Pat. No. 7,643,690 and claims the benefit of priority under 35 U.S.C. §119 from Japanese Application Nos. 2005-299326 and 2004-336463 filed respectively on Oct. 13, 2005 and Nov. 19, 2004. U.S. application Ser. No. 11/281,553 is herein incorporated by reference.

BACKGROUND OF THE INVENTION

1. Field of the Invention

The present invention relates to image decoding apparatus, image decoding program, image decoding method, image encoding apparatus, image encoding program, and image encoding method.

2. Related Background Art

A well-known technology is a super resolution technique (the term "super resolution" will be referred to hereinafter as SR) of generating a high-resolution image (the term "high resolution" will be referred to hereinafter as HR) from a plurality of low-resolution images (the term "low resolution" will be referred to hereinafter as LR) reconstructed through decoding of encoded video data (e.g., "C. A. Segall et al., "High-Resolution Images from Low-Resolution Compressed Video," IEEE Signal Processing Magazine, May 2003, pp. 37-48," which will be referred to hereinafter as "Non-patent Document 1").

The SR technique permits us to generate an HR image from a plurality of LR images by modeling relations between a plurality of LR images and one HR image and statistically processing known information and estimated information. FIG. 1 shows a model between LR images and an HR image. This model assumes that original LR images 104 of multiple frames (L frames) are generated from an original HR image 101. In this assumption, motion models 201-1, 201-2, . . . , 201-L are applied to the original HR image 101 to generate the original LR images 104-1, 104-2, . . . , 104-L. On this occasion, a sampling process is performed on the HR image using sampling model 202 based on low-pass filtering and down-sampling to generate the original LR images 104-1, 104-2, . . . , 104-L. Assuming that quantization noises 103-1, 103-2, . . . , 103-L represent differences between reconstructed LR images 102-1, 102-2, . . . , 102-L generated through decoding of encoded video data, and the original LR images 104-1, 104-2, . . . , 104-L, the relationship between the original HR image $f\_k(x,z)$ of frame k, where $1 \leq x \leq 2M$ and $1 \leq z \leq 2N$, and the reconstructed LR image $y\_l(m,n)$ of frame l, where $1 \leq m \leq M$ and $1 \leq n \leq N$ can be modeled by Eq. 1 below.

$$y\_l = AHC(d\_lk) \times f\_k + e\_l \quad \text{(Eq. 1)}$$

In this equation, l represents an integer from 1 to L, $C(d\_lk)$ a matrix of a motion model between HR images of frame k and frame l, AH a matrix of a sampling model (where H indicates a 4MN×4MN matrix representing a filtering process of HR image and A an MN×4MN down-sampling matrix), and $e\_l$ the quantization noise of the reconstructed LR image of frame l.

In this manner, a certain reconstructed LR image generated from encoded video data and an HR image can be modeled by the motion model indicating the time-space correspondence between the LR and HR images, and the signal model of noise generated in the process of degradation from HR image to LR image. Therefore, an HR image can be generated from a plurality of reconstructed LR images by defining a cost function to evaluate estimates of the motion model and signal model by statistical means and by solving a nonlinear optimization process. Solutions to be obtained in this optimization process are motion information (SR motion information) representing a time-space correspondence between LR and HR images for each of the plurality of LR images, and the HR image.

One of methods of the optimization process is, for example, the coordinate-descent method ("H. He, and L. P. Kondi, "MAP Based Resolution Enhancement of Video Sequences Using a Huber-Markov Random Field Image Prior Model," Proc. of IEEE International Conference on Image Processing Vol. II, (Spain), September 2003, pp. 933-936," which will be referred to hereinafter as "Non-patent Document 2"). In this method, first, a virtual HR image (a provisional HR image in the optimization using iterations) is generated by interpolation from a reconstructed LR image. While the HR image is not changed, motion information representing time-space correspondences between the virtual HR image and a plurality of LR images is then determined by use of the cost function. Next, while the motion information thus determined is not changed, the virtual HR image is updated by use of the cost function. Furthermore, while the virtual HR image is not changed, the motion information is updated. This process is iterated before convergence is reached to a solution.

SUMMARY OF THE INVENTION

In the conventional super resolution technology, it is difficult to accurately perform the motion detection between the LR images and HR image because of influence of coding noise and sampling blur of the LR images, uncertainty of the assumption model, etc. in the resolution enhancement process of generating the HR image from a plurality of images. In addition, the resolution enhancement process requires enormous computational complexity for the motion detection between images and for the optimization process.

The present invention has been accomplished in order to solve the above problem and an object of the invention is to provide image decoding apparatus, image decoding program, image decoding method, image encoding apparatus, image encoding program, and image encoding method capable of improving the accuracy of the motion detection between images, while reducing the computational complexity for the image resolution enhancement process.

An image decoding apparatus according to the present invention is an image decoding apparatus comprising: video data decoding means for receiving and decoding encoded video data to acquire a plurality of reconstructed images; subsidiary data decoding means for receiving and decoding subsidiary data to acquire subsidiary motion information; and resolution enhancing means for generating motion vectors representing time-space correspondences between the plurality of reconstructed images, based on the subsidiary motion information acquired by the subsidiary data decoding means, and for generating a high-resolution image with a spatial resolution higher than that of the plurality of reconstructed images, using the generated motion vectors and the plurality of reconstructed images acquired by the video data decoding means.

The foregoing image decoding apparatus generates the motion vectors on the basis of the subsidiary motion information and generates the high-resolution image with the spatial resolution higher than that of the plurality of reconstructed images, using the generated motion vectors and the plurality of reconstructed images.

The above image decoding apparatus preferably adopts one of the following modes. Specifically, the image decoding apparatus is preferably constructed in a configuration wherein the subsidiary motion information contains subsidiary motion vectors and wherein the resolution enhancing means uses the subsidiary motion vectors as the motion vectors.

The image decoding apparatus is preferably constructed in another configuration wherein the subsidiary motion information contains subsidiary motion vectors and wherein the resolution enhancing means detects intermediate motion vectors, using the plurality of reconstructed images, and generates the motion vectors by addition of the intermediate motion vectors and the subsidiary motion vectors.

The image decoding apparatus is preferably constructed in another configuration wherein the subsidiary motion information contains subsidiary motion vectors and wherein the resolution enhancing means defines the subsidiary motion vectors as initial motion vectors of the motion vectors, and updates the initial motion vectors by use of the plurality of reconstructed images to generate the motion vectors.

Furthermore, the image decoding apparatus is preferably constructed in another configuration wherein the subsidiary motion information contains a motion vector generation condition as a necessary condition for generation of the motion vectors and wherein the resolution enhancing means generates the motion vectors based on the plurality of reconstructed images on the basis of the motion vector generation condition.

An image encoding apparatus according to the present invention is an image encoding apparatus comprising: image sampling means for converting a high-resolution image into low-resolution images; video data encoding means for encoding the plurality of low-resolution images generated by the image sampling means, to generate encoded video data; video data decoding means for decoding the encoded video data generated by the video data encoding means, to acquire reconstructed low-resolution images; subsidiary motion information generating means for generating subsidiary motion information necessary for generation of motion vectors, using the high-resolution image or the low-resolution images; resolution enhancing means for generating the motion vectors representing time-space correspondences between the plurality of reconstructed low-resolution images acquired by the video data decoding means, based on the subsidiary motion information generated by the subsidiary motion information generating means, and for generating a reconstructed high-resolution image, using the generated motion vectors and the plurality of reconstructed low-resolution images; and subsidiary data encoding means for encoding the subsidiary motion information generated by the subsidiary motion information generating means, as subsidiary data.

The foregoing image encoding apparatus generates the subsidiary motion information necessary for generation of the motion vectors, using the high-resolution image or low-resolution images, generates the motion vectors on the basis of the generated subsidiary motion information, generates the reconstructed high-resolution image by use of the generated motion vectors and the plurality of reconstructed low-resolution images, and encodes the subsidiary motion information as subsidiary data.

Another image decoding apparatus according to the present invention is an image decoding apparatus comprising: coded data decoding means for receiving and entropy-decoding coded data to acquire a motion vector generation condition as a necessary condition for generation of motion vectors, and coding information indicating prediction error image signals; an image memory for storing decoded image signals; motion vector generating means for generating the motion vectors based on the decoded image signals stored in the image memory, on the basis of the motion vector generation condition acquired by the coded data decoding means; predicted image signal generating means for generating predicted image signals, using the decoded image signals and the motion vectors generated by the motion vector generating means; decoding means for decoding the coding information acquired by the coded data decoding means, to acquire the prediction error image signals; and storing means for adding the predicted image signals generated by the predicted image signal generating means, to the prediction error image signals acquired by the decoding means, to reconstruct the decoded image signals, and for storing the decoded image signals into the image memory.

The foregoing image decoding apparatus generates the motion vectors based on the decoded image signals stored in the image memory, on the basis of the motion vector generation condition as the necessary condition for generation of the motion vectors, and generates the predicted image signals by use of the generated motion vectors and the decoded image signals. On the other hand, the apparatus decodes the coding information indicating the prediction error image signals, to acquire the prediction error image signals, thereafter adds the prediction error image signals to the generated predicted image signals to reconstruct the decoded image signals, and stores the decoded image signals into the image memory.

Another image encoding apparatus according to the present invention is an image encoding apparatus comprising: inputting means for inputting input image signals; an image memory for storing decoded image signals; motion vector generation condition determining means for determining a motion vector generation condition as a necessary condition for generation of motion vectors, based on the input image signals inputted by the inputting means; motion vector generating means for generating the motion vectors based on the decoded image signals stored in the image memory, on the basis of the motion vector generation condition determined by the motion vector generation condition determining means; predicted image signal generating means for generating predicted image signals, using the motion vectors generated by the motion vector generating means and the decoded image signals; prediction error image signal generating means for generating prediction error image signals based on the input image signals inputted by the inputting means and the predicted image signals generated by the predicted image signal generating means; coding information acquiring means for encoding the prediction error image signals generated by the prediction error image signal generating means, to acquire coding information; local decoding means for decoding the coding information acquired by the coding information acquiring means, to acquire decoded prediction error image signals; storing means for restoring the decoded image signals based on the predicted image signals generated by the predicted image signal generating means and the decoded prediction error image signals acquired by the local decoding means, and for storing the decoded image signals into the image memory; and coded data generating means for entropy-encoding the motion vector generation condition determined by the motion vector generation condition determining means and the coding information acquired by the coding information acquiring means, to generate coded data.

The forging image encoding apparatus determines the motion vector generation condition as the necessary condition for generation of the motion vectors, based on the input image signals, generates the motion vectors based on the decoded image signals stored in the image memory, on the basis of the motion vector generation condition thus determined, and generates the predicted image signals, using the generated motion vectors and the decoded image signals. On the other hand, the apparatus generates the prediction error image signals based on the input image signals and the predicted image signals generated, encodes the prediction error image signals thus generated, to acquire the coding information, and decodes the resultant coding information to obtain the decoded prediction error image signals. Then the apparatus reconstructs the decoded image signals based on the predicted image signals generated and the decoded prediction error image signals obtained, stores the decoded image signals into the image memory, and entropy-encodes the motion vector generation condition and the coding information to generate the coded data.

The image decoding apparatus according to the present invention can adopt the following modes.

An image decoding apparatus according to the present invention can adopt a configuration comprising: video data decoding means for receiving and decoding encoded video data to acquire a plurality of reconstructed images; subsidiary data decoding means for receiving and decoding subsidiary data to acquire subsidiary motion information; and resolution enhancing means for generating motion vectors representing time-space correspondences between the plurality of reconstructed images acquired by the video data decoding means and a high-resolution image, and for generating the high-resolution image with a spatial resolution higher than that of the plurality of reconstructed images, using the generated motion vectors and the plurality of reconstructed images, wherein the resolution enhancing means iteratively carries out a motion vector generating process of generating the motion vectors on the basis of the subsidiary motion information acquired by the subsidiary data decoding means and a previously generated high-resolution image, and a high-resolution image generating process of generating a high-resolution image based on the generated motion vectors and the plurality of reconstructed images.

The above apparatus may adopt a configuration wherein the resolution enhancing means carries out the motion vector generating process based on the subsidiary motion information in each of iterations of the motion vector generating process and the high-resolution image generating process, or may adopt a configuration wherein the subsidiary motion information contains specific cycle information representing a specific cycle in iterations of the motion vector generating process and the high-resolution image generating process and wherein the resolution enhancing means carries out the motion vector generating process based on the subsidiary motion information, in the motion vector generating process in the specific cycle represented by the specific cycle information.

An image decoding apparatus according to the present invention can adopt a configuration comprising: video data decoding means for receiving and decoding encoded video data to acquire a plurality of reconstructed images; an image memory for storing a high-resolution image resulting from resolution enhancement; resolution enhancing means for generating motion vectors representing time-space correspondences between the plurality of reconstructed images, for generating a first high-resolution image with a spatial resolution higher than that of the plurality of reconstructed images, using the generated motion vectors and the plurality of reconstructed images acquired by the video data decoding means, and for generating a second high-resolution image, using the generated first high-resolution image and the high-resolution image stored in the image memory; and image storing means for storing the first or second high-resolution image generated by the resolution enhancing means, into the image memory.

Another image decoding apparatus according to the present invention can adopt a configuration comprising: video data decoding means for receiving and decoding encoded video data to acquire a plurality of reconstructed images; subsidiary data decoding means for receiving and decoding subsidiary data to acquire subsidiary motion information; an image memory for storing a high-resolution image resulting from resolution enhancement; resolution enhancing means for generating motion vectors representing time-space correspondences between the plurality of reconstructed images, for generating a first high-resolution image with a spatial resolution higher than that of the plurality of reconstructed images, using the generated motion vectors and the plurality of reconstructed images acquired by the video data decoding means, and for generating a second high-resolution image by use of the generated first high-resolution image and the high-resolution image stored in the image memory, based on the subsidiary motion information acquired by the subsidiary data decoding means; and image storing means for storing the first or second high-resolution image generated by the resolution enhancing means, into the image memory.

Another image decoding apparatus according to the present invention can adopt a configuration comprising: video data decoding means for receiving and decoding encoded video data to acquire a plurality of reconstructed images and reconstructed motion vectors; subsidiary data decoding means for receiving and decoding subsidiary data to acquire subsidiary motion information necessary for modification of the reconstructed motion vectors; and resolution enhancing means for generating motion vectors representing time-space correspondences between the plurality of reconstructed images and for generating a high-resolution image with a spatial resolution higher than that of the plurality of reconstructed images, using the generated motion vectors and the plurality of reconstructed images acquired by the video data decoding means, wherein the resolution enhancing means defines reconstructed motion vectors modified based on the subsidiary motion information acquired by the subsidiary data decoding means, as initial motion vectors of the motion vectors, and updates the initial motion vectors by use of the plurality of reconstructed images to generate the motion vectors.

The present invention can be described as the invention of the image decoding apparatus and image encoding apparatus as described above, and can also be described as the invention of the image decoding method, image decoding program, image encoding method, and image encoding program as described below. These are different only in embodied forms and product forms, while achieving the same action and effect.

An image decoding method according to the present invention is an image decoding method comprising: a video data decoding step of receiving and decoding encoded video data to acquire a plurality of reconstructed images; a subsidiary data decoding step of receiving and decoding subsidiary data to acquire subsidiary motion information; and a resolution enhancing step of generating motion vectors representing time-space correspondences between the plurality of reconstructed images, based on the subsidiary motion information acquired in the subsidiary data decoding step, and generating a high-resolution image with a spatial resolution higher than that of the plurality of reconstructed images, using the generated motion vectors and the plurality of reconstructed images acquired in the video data decoding step.

An image encoding method according to the present invention is an image encoding method comprising: an image sampling step of converting a high-resolution image into low-resolution images; a video data encoding step of encoding the plurality of low-resolution images generated in the image sampling step, to generate encoded video data; a video data decoding step of decoding the encoded video data generated in the video data encoding step, to acquire reconstructed low-resolution images; a subsidiary motion information generating step of generating subsidiary motion information necessary for generation of motion vectors, using the high-resolution image or the low-resolution images; a resolution enhancing step of generating the motion vectors representing time-space correspondences between the plurality of reconstructed low-resolution images acquired in the video data decoding step, based on the subsidiary motion information generated in the subsidiary motion information generating step, and generating a reconstructed high-resolution image, using the generated motion vectors and the plurality of reconstructed low-resolution images; and a subsidiary data encoding step of encoding the subsidiary motion information generated in the subsidiary motion information generating step, as subsidiary data.

Another image decoding method according to the present invention is an image decoding method comprising: a coded data decoding step of receiving and entropy-decoding coded data to acquire a motion vector generation condition as a necessary condition for generation of motion vectors, and to acquire coding information indicating prediction error image signals; a motion vector generating step of generating the motion vectors based on decoded image signals stored in an image memory, on the basis of the motion vector generation condition acquired in the coded data decoding step; a predicted image signal generating step of generating predicted image signals, using the motion vectors generated in the motion vector generating step and the decoded image signals; a decoding step of decoding the coding information acquired in the coded data decoding step, to acquire the prediction error image signals; and a storing step of adding the predicted image signals generated in the predicted image signal generating step, to the prediction error image signals acquired in the decoding step, to reconstruct the decoded image signals, and storing the decoded image signals into the image memory.

Another image encoding method according to the present invention is an image encoding method comprising: an inputting step of inputting input image signals; a motion vector generation condition determining step of determining a motion vector generation condition as a necessary condition for generation of motion vectors, based on the input image signals inputted in the inputting step; a motion vector generating step of generating the motion vectors based on decoded image signals stored in an image memory, on the basis of the motion vector generation condition determined in the motion vector generation condition determining step; a predicted image signal generating step of generating predicted image signals, using the motion vectors generated in the motion vector generating step and the decoded image signals; a prediction error image signal generating step of generating prediction error image signals based on the input image signals inputted in the inputting step and the predicted image signals generated in the predicted image signal generating step; a coding information acquiring step of encoding the prediction error image signals generated in the prediction error image signal generating step, to acquire coding information; a local decoding step of decoding the coding information acquired in the coding information acquiring step, to acquire decoded prediction error image signals; a storing step of restoring the decoded image signals based on the predicted image signals generated in the predicted image signal generating step and the decoded prediction error image signals acquired in the local decoding step, and storing the decoded image signals into the image memory; and a coded data generating step of entropy-encoding the motion vector generation condition determined in the motion vector generation condition determining step and the coding information acquired in the coding information acquiring step, to generate coded data.

An image decoding program according to the present invention is an image decoding program for letting a computer in an image decoding apparatus function as: video data decoding means for receiving and decoding encoded video data to acquire a plurality of reconstructed images; subsidiary data decoding means for receiving and decoding subsidiary data to acquire subsidiary motion information; and resolution enhancing means for generating motion vectors representing time-space correspondences between the plurality of reconstructed images, based on the subsidiary motion information acquired by the subsidiary data decoding means, and for generating a high-resolution image with a spatial resolution higher than that of the plurality of reconstructed images, using the generated motion vectors and the plurality of reconstructed images acquired by the video data decoding means.

An image encoding program according to the present invention is an image encoding program for letting a computer in an image encoding apparatus function as: image sampling means for converting a high-resolution image into low-resolution images; video data encoding means for encoding the plurality of low-resolution images generated by the image sampling means, to generate encoded video data; video data decoding means for decoding the encoded video data generated by the video data encoding means, to acquire reconstructed low-resolution images; subsidiary motion information generating means for generating subsidiary motion information necessary for generation of motion vectors, using the high-resolution image or the low-resolution images; resolution enhancing means for generating the motion vectors representing time-space correspondences between the plurality of reconstructed low-resolution images acquired by the video data decoding means, based on the subsidiary motion information generated by the subsidiary motion information generating means, and for generating a reconstructed high-resolution image, using the generated motion vectors and the plurality of reconstructed low-resolution images; and subsidiary data encoding means for encoding the subsidiary motion information generated by the subsidiary motion information generating means, as subsidiary data.

Another image decoding program according to the present invention is an image decoding program for letting a computer in an image decoding apparatus function as: coded data decoding means for receiving and entropy-decoding coded data to acquire a motion vector generation condition as a necessary condition for generation of motion vectors, and coding information indicating prediction error image signals;

an image memory for storing decoded image signals; motion vector generating means for generating the motion vectors based on the decoded image signals stored in the image memory, on the basis of the motion vector generation condition acquired by the coded data decoding means; predicted image signal generating means for generating predicted image signals, using the motion vectors generated by the motion vector generating means and the decoded image signals; decoding means for decoding the coding information acquired by the coded data decoding means, to acquire the prediction error image signals; and storing means for adding the predicted image signals generated by the predicted image signal generating means, to the prediction error image signals acquired by the decoding means, to reconstruct the decoded image signals, and for storing the decoded image signals into the image memory.

Another image encoding program according to the present invention is an image encoding program for letting a computer in an image encoding apparatus function as: inputting means for inputting input image signals; an image memory for storing decoded image signals; motion vector generation condition determining means for determining a motion vector generation condition as a necessary condition for generation of motion vectors, based on the input image signals inputted by the inputting means; motion vector generating means for generating the motion vectors based on the decoded image signals stored in the image memory, on the basis of the motion vector generation condition determined by the motion vector generation condition determining means; predicted image signal generating means for generating predicted image signals, using the motion vectors generated by the motion vector generating means and the decoded image signals; prediction error image signal generating means for generating prediction error image signals based on the input image signals inputted by the inputting means and the predicted image signals generated by the predicted image signal generating means; coding information acquiring means for encoding the prediction error image signals generated by the prediction error image signal generating means, to acquire coding information; local decoding means for decoding the coding information acquired by the coding information acquiring means, to acquire decoded prediction error image signals; storing means for restoring the decoded image signals based on the predicted image signals generated by the predicted image signal generating means and the decoded prediction error image signals acquired by the local decoding means, and for storing the decoded image signals into the image memory; and coded data generating means for entropy-encoding the motion vector generation condition determined by the motion vector generation condition determining means and the coding information acquired by the coding information acquiring means, to generate coded data.

The present invention described above improves the accuracy of the motion detection between images and improves the image quality of the reconstructed high-resolution image. Since the processing load of the motion search is reduced, the computational complexity is reduced for the image resolution enhancement.

DESCRIPTION OF THE PREFERRED EMBODIMENTS

Embodiments of the present invention will be described with reference to FIGS. 2 to 12.

Figure 2:
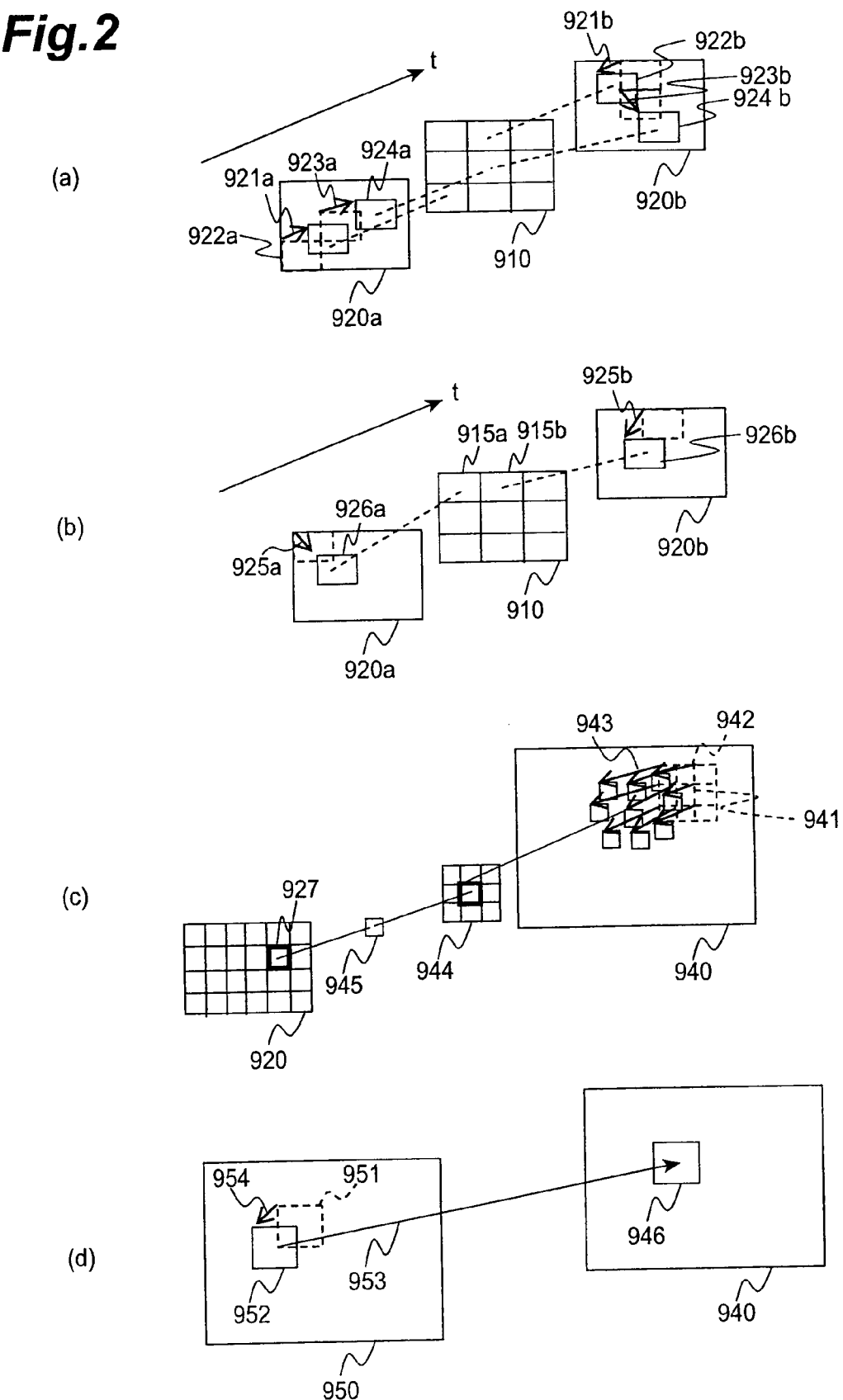
FIG. 2 is an illustration to illustrate types of motion information associated with subsidiary data of the present invention.
Figure 3:
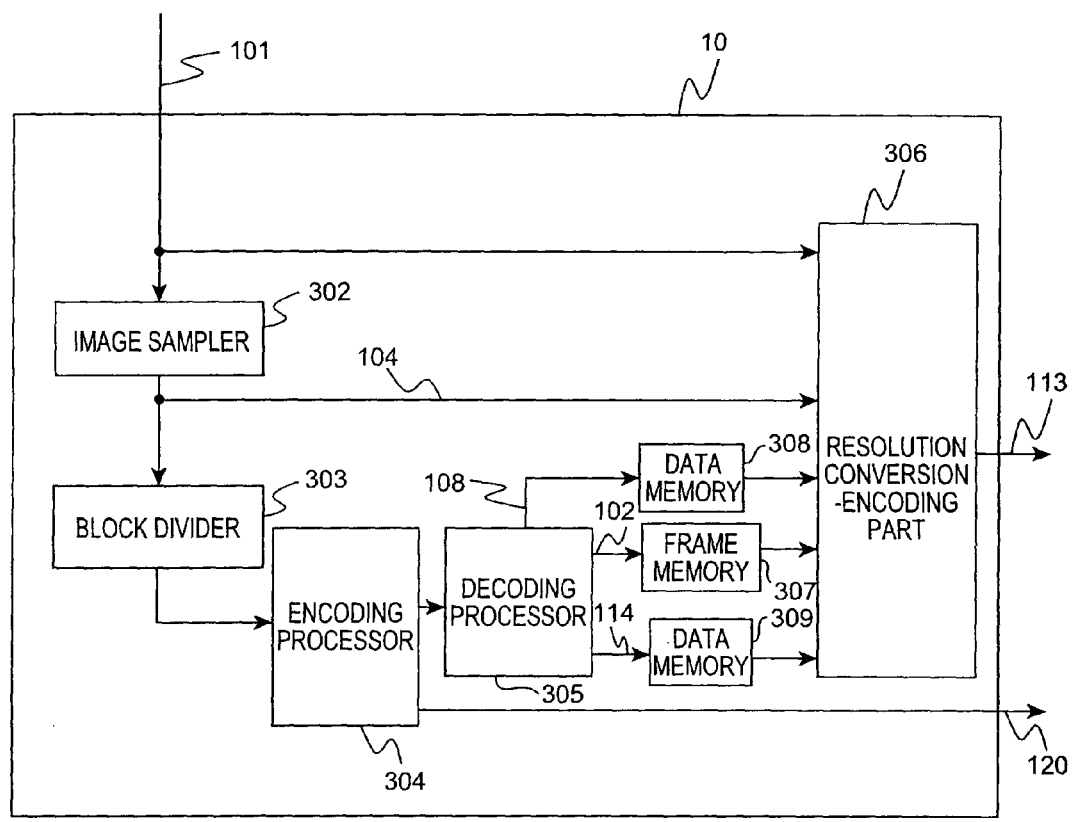
FIG. 3 is an illustration to illustrate an overall configuration of an encoding apparatus according to the present invention.
Figure 4:
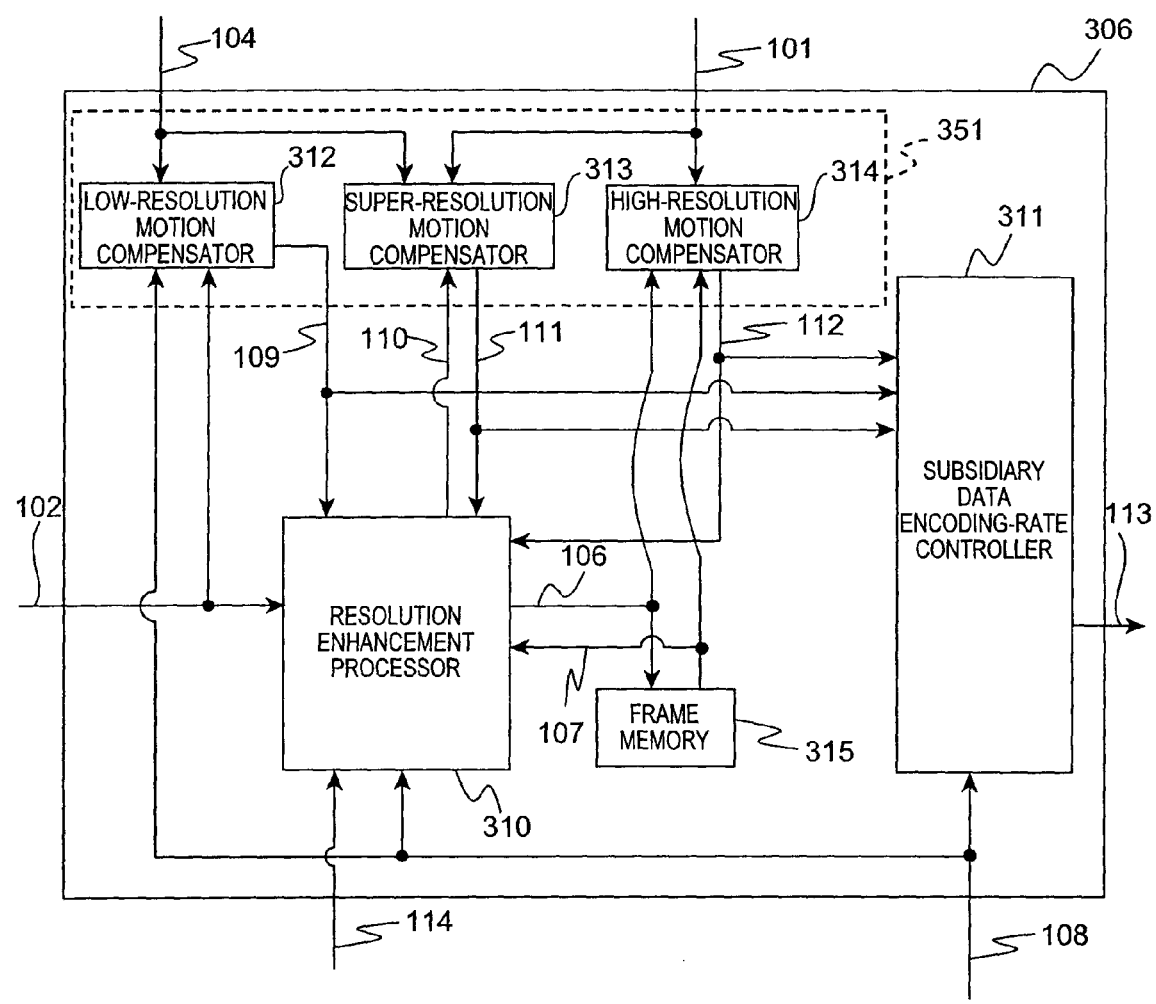
FIG. 4 is an illustration to illustrate a configuration of an encoding process according to the present invention.
Figure 5:
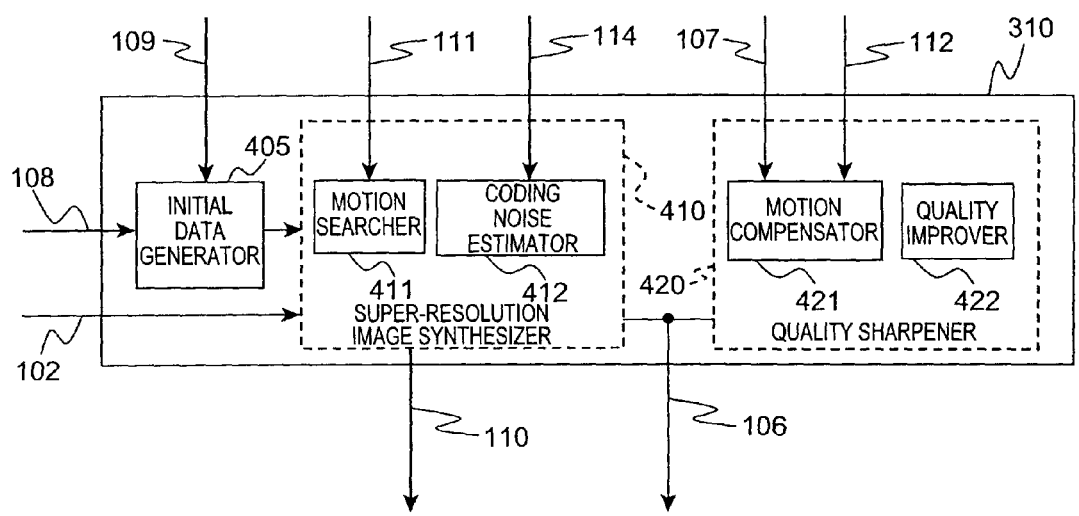
FIG. 5 is an illustration to illustrate a resolution enhancement process using the encoding process according to the present invention.
Figure 6:
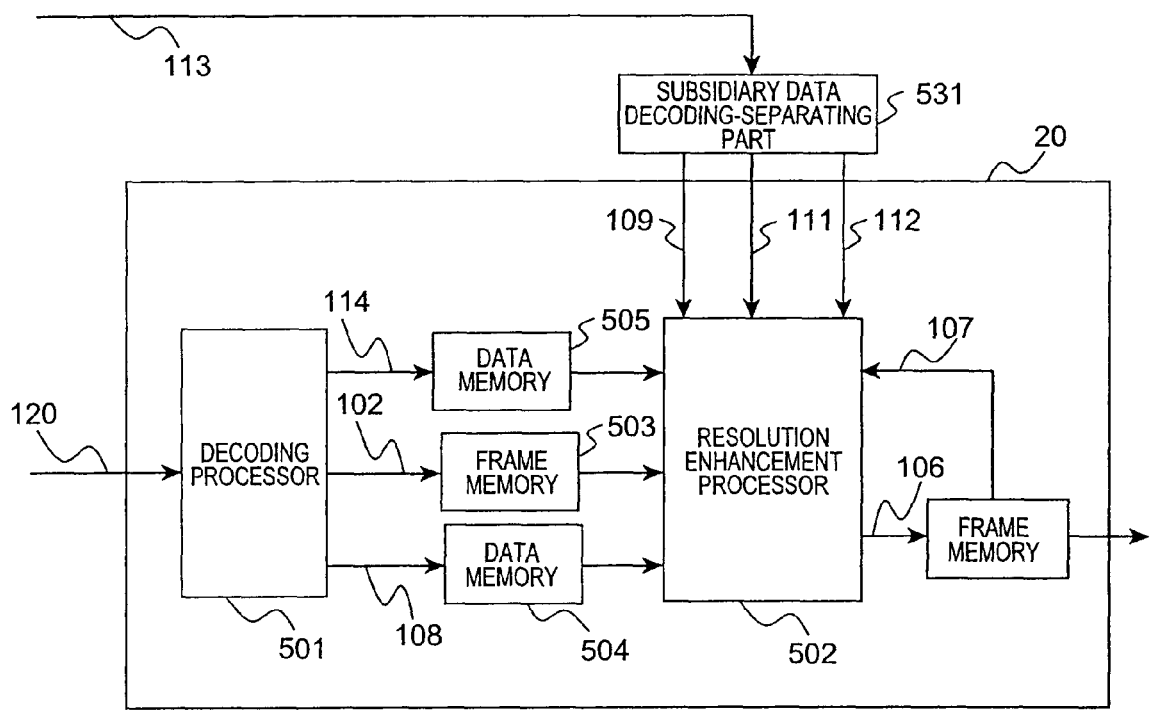
FIG. 6 is an illustration to illustrate an overall configuration of a decoding apparatus according to the present invention.
Figure 7:
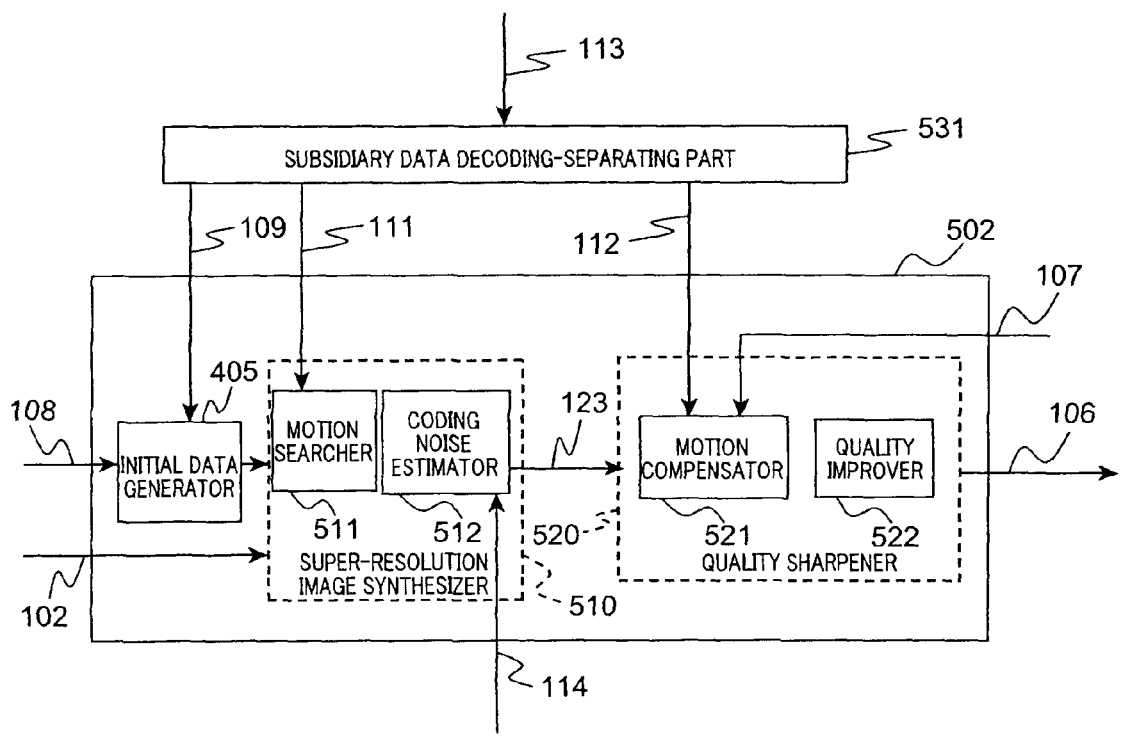
FIG. 7 is an illustration to illustrate a resolution enhancement process using a decoding process according to the present invention.
Figure 8:
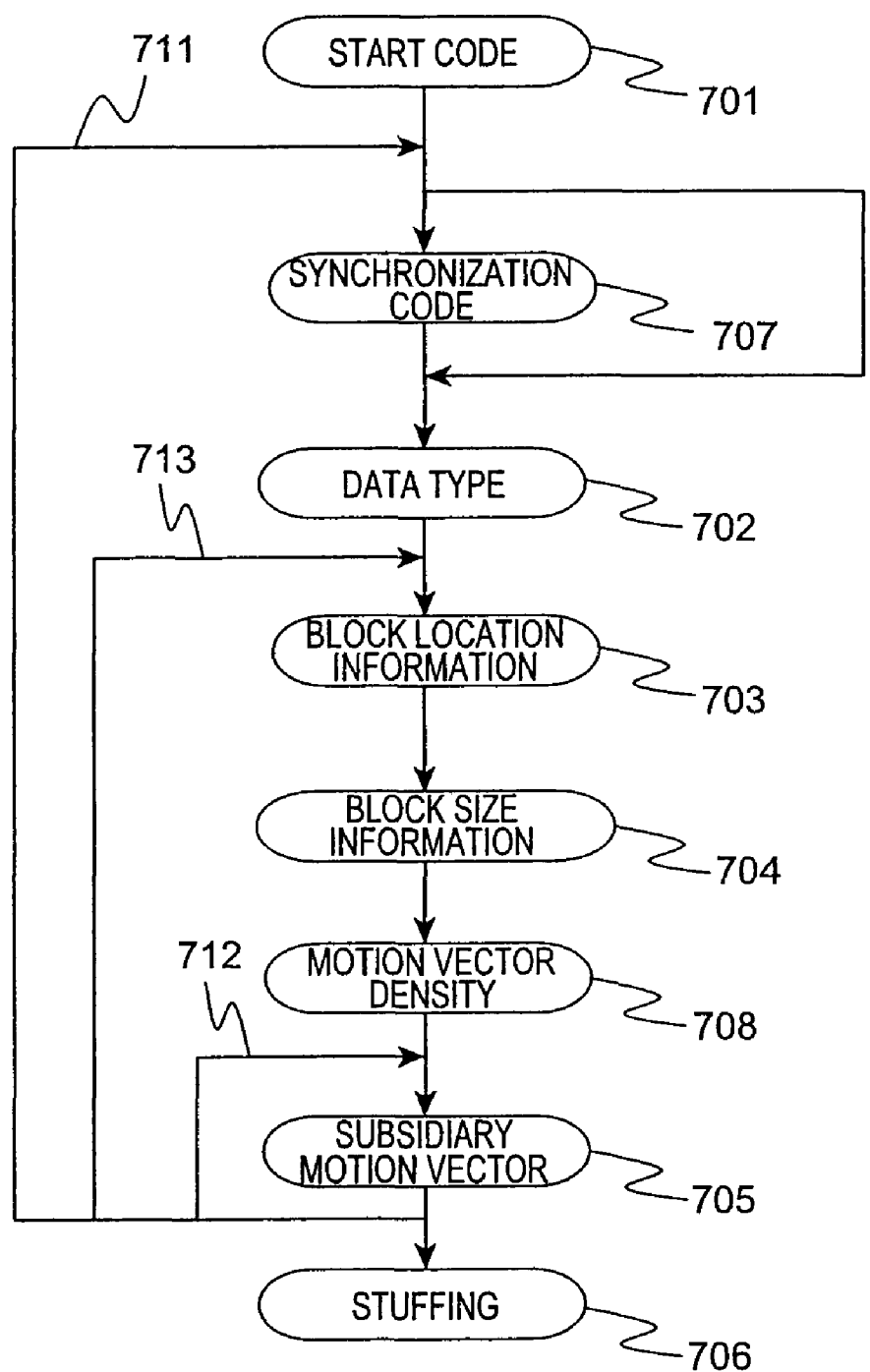
FIG. 8 is an illustration to show a data configuration of subsidiary data according to the present invention.
Figure 9:
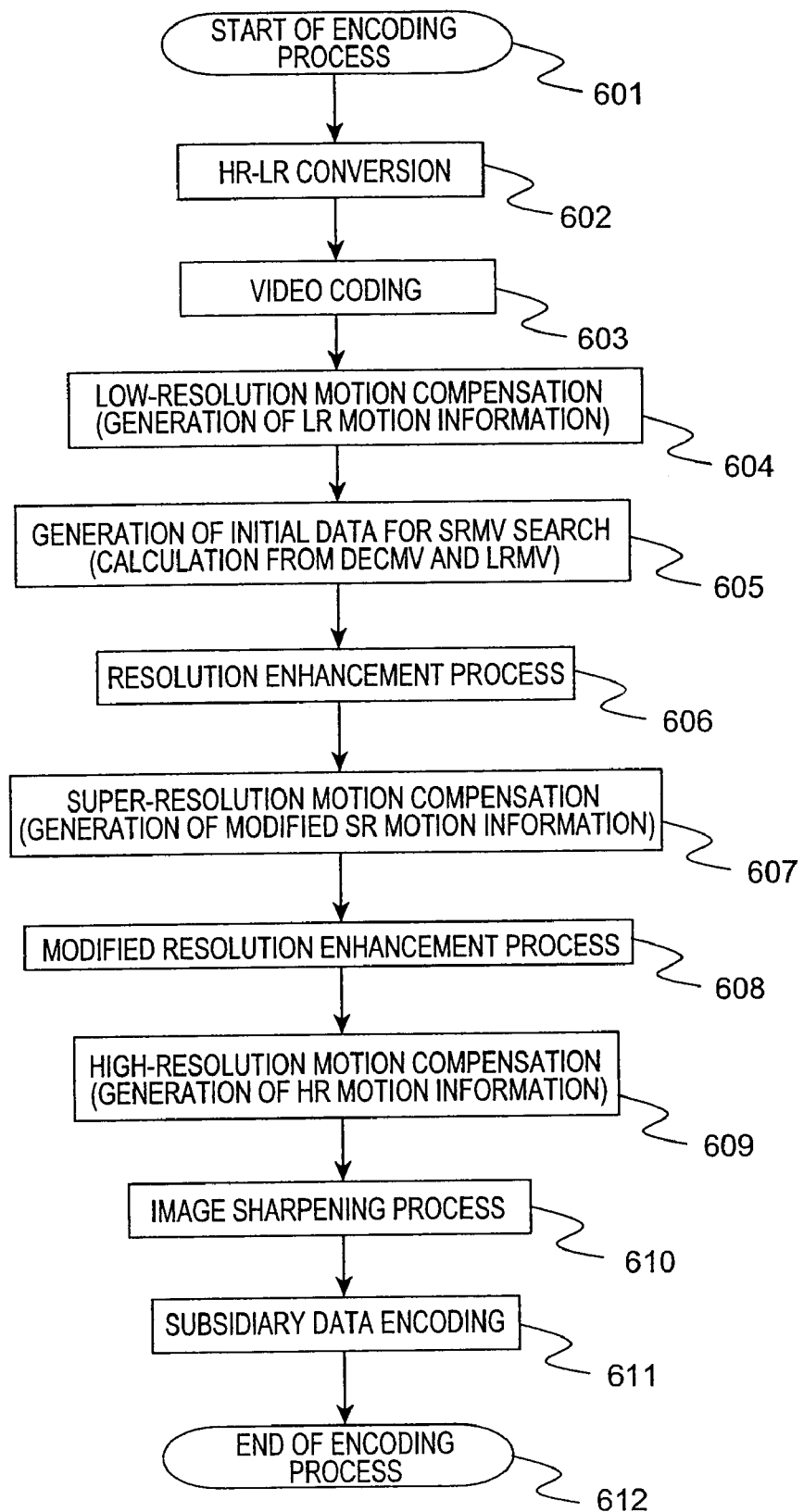
FIG. 9 is an illustration to illustrate an encoding process flow according to the present invention.
Figure 10:
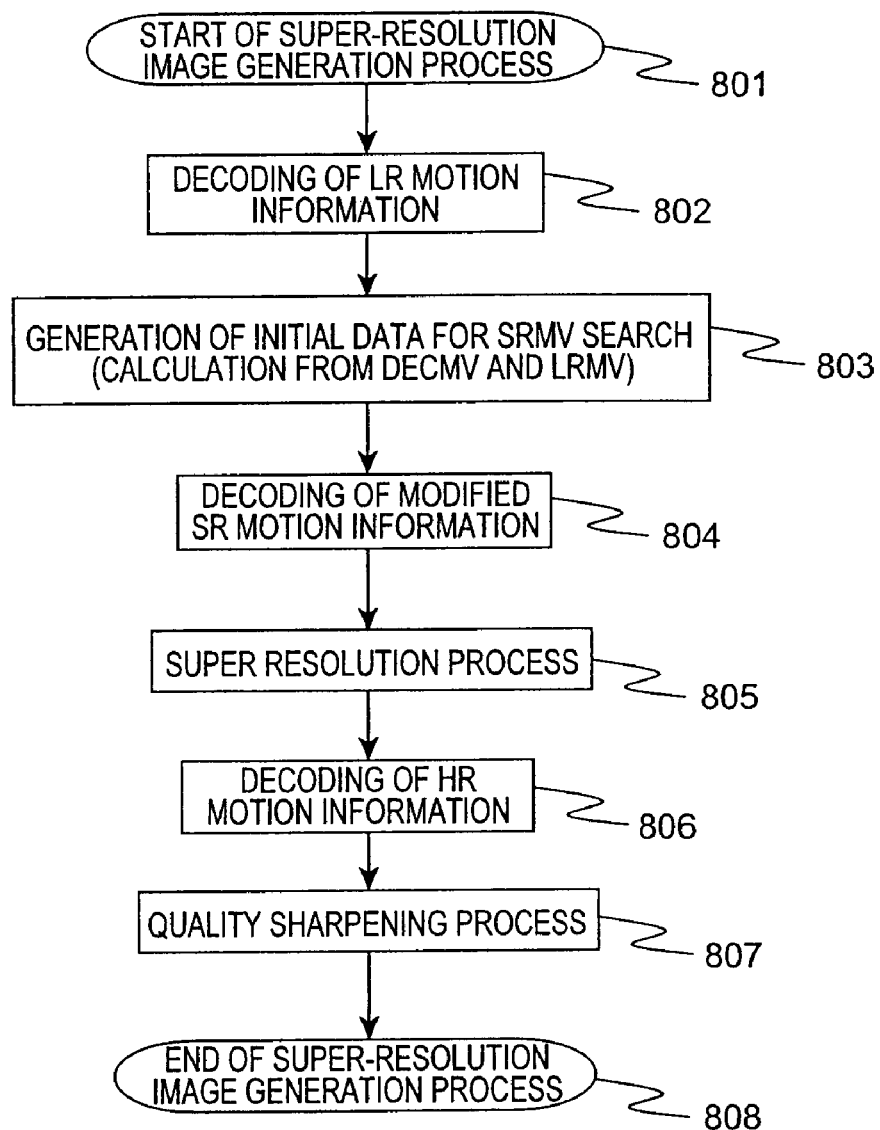
FIG. 10 is an illustration to illustrate a resolution enhancement process flow using subsidiary data according to the present invention.
Figure 11:
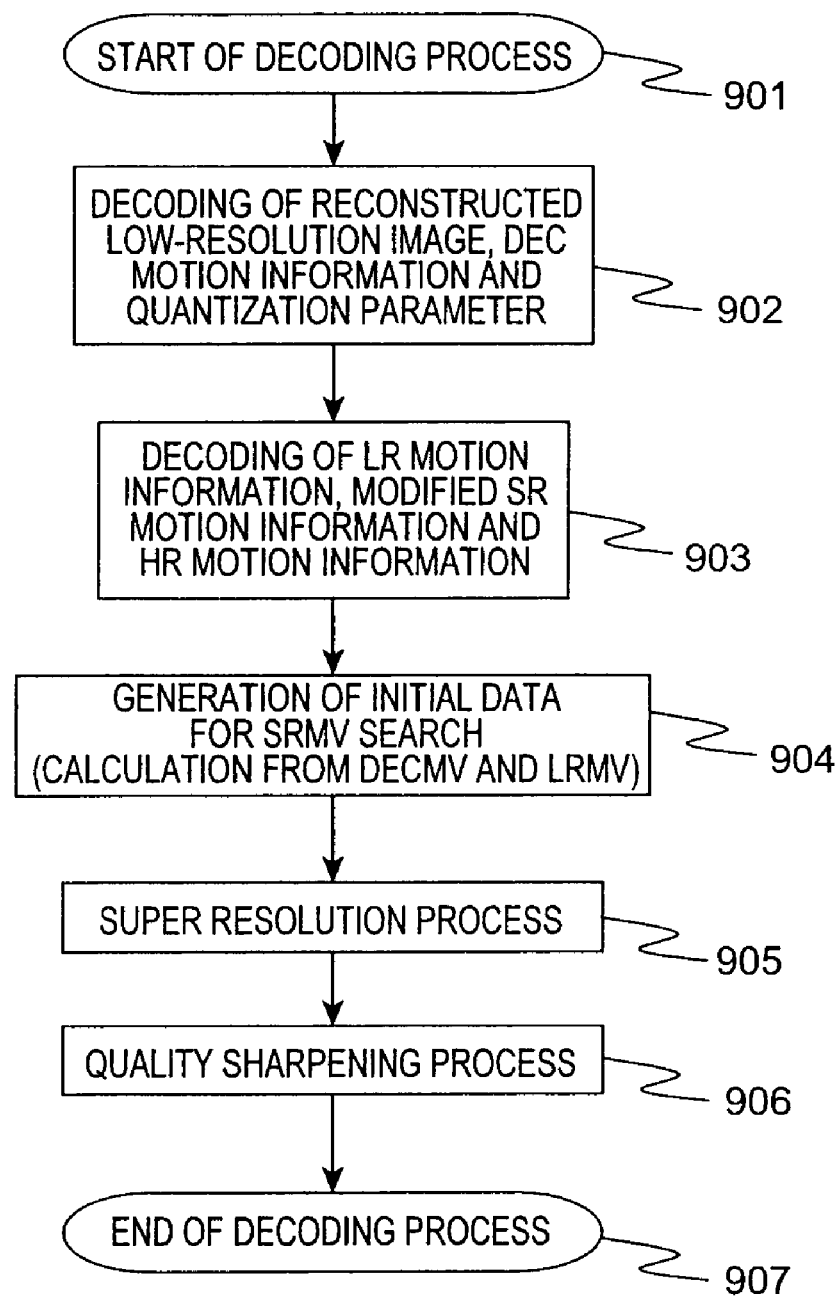
FIG. 11 is an illustration to illustrate a decoding process flow according to the present invention.
Figure 12:
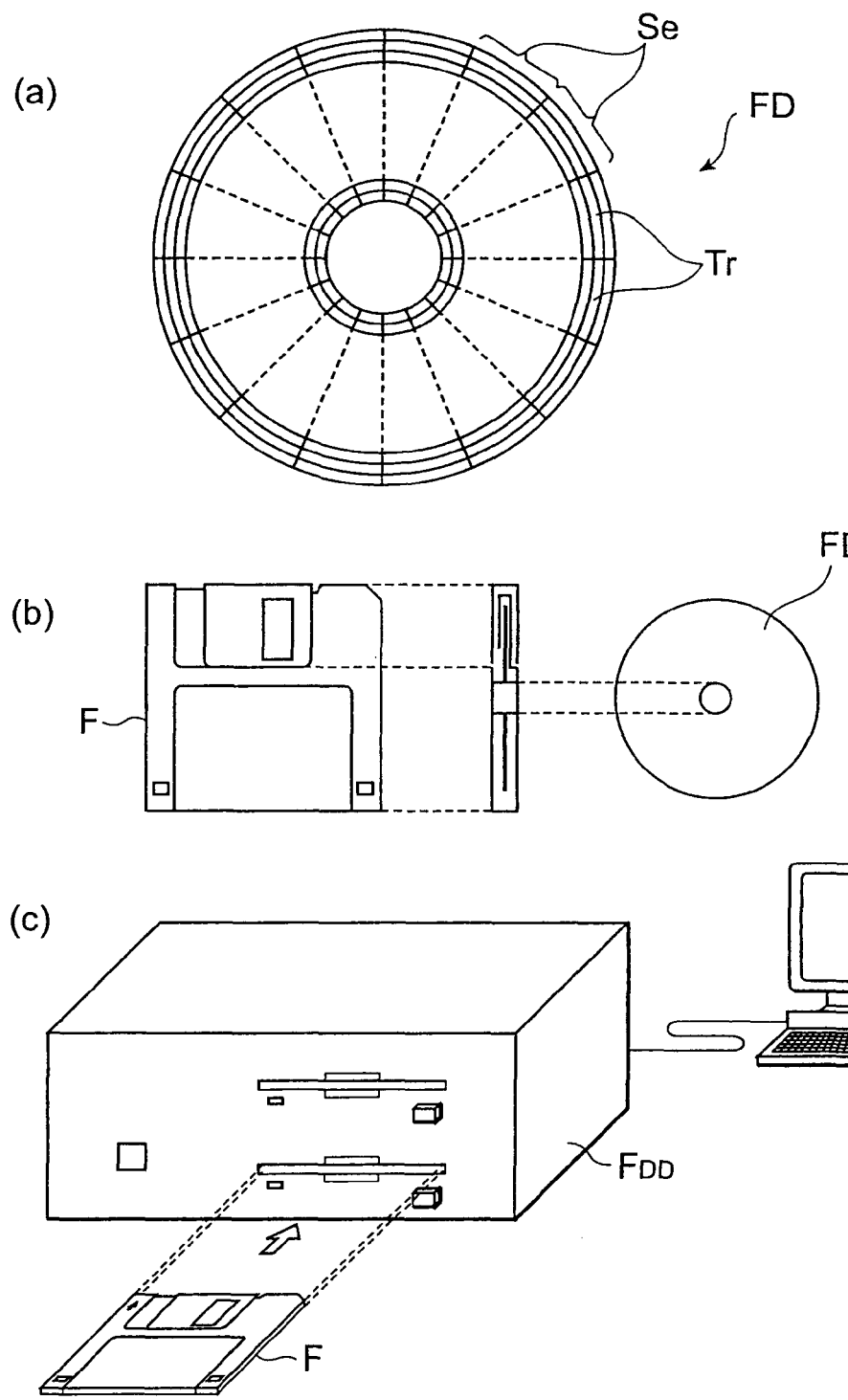
FIG. 12 is an illustration to illustrate a data storage medium for storing a program for implementing an image encoding process or image decoding process according to an embodiment of the present invention by a computer system.

FIG. 2 is an illustration to illustrate motion vectors, among data contained in some kinds of motion information. FIGS. 3 to 5 are illustrations to illustrate configurations of an encoding apparatus according to the present invention, and FIGS. 6 and 7 illustrations to illustrate configurations of a decoding apparatus according to the present invention. FIG. 8 is an illustration to illustrate a data format configuration of subsidiary data in the present invention. FIGS. 9 to 11 are illustrations to illustrate a processing flow of encoding, a processing flow of super-resolution image generation, and a processing flow of decoding, respectively. FIG. 12 is an illustration to illustrate a data storage medium storing a program for implementing an image encoding process or image decoding process by a computer system.

The subsidiary data in the present invention has subsidiary motion information, and, as described later, the subsidiary motion information includes low-resolution motion information (LR motion information), modified super-resolution motion information (modified SR motion information), and high-resolution motion information (HR motion information). The term "low resolution" will be abbreviated to LR, "high resolution" to HR, and "super resolution" to SR as occasion may demand. An image with a resolution higher than that of a "low-resolution image (LR image)" will be described as a "high-resolution image (HR image)."

First, an encoding apparatus 10 according to an embodiment of the present invention will be described.

FIG. 3 shows the overall configuration of the encoding apparatus 10 according to an embodiment of the present invention. The encoding apparatus 10 has image sampler 302, block divider 303, encoding processor 304, decoding processor 305, data memory 308, frame memory 307, data memory 309, and resolution conversion-encoding part 306.

The image sampler 302 having a low-pass filter and a down-sampling processor converts original HR image 101 into original LR image 104 with a resolution lower than that of the original HR image. The block divider 303 divides the converted original LR image 104 into coding blocks and, for example, the coding blocks are inputted into the encoding processor 304 in the raster scan order from upper left to lower right of the image. The encoding processor 304 performs motion picture coding of each input block to compress it into encoded video data 120. The encoding processor 304 outputs the encoded video data 120 to the decoding processor 305. The decoding processor 305 decodes the encoded video data 120 to generate reconstructed LR image 102 and decoded motion information (hereinafter referred to as "DEC motion information") 108. Since the encoding processor 304 internally has a local decoding processor, the local decoding processor in the encoding processor 304 can be used as a substitute for the decoding processor 305.

The encoding processor 304 and the decoding processor 305 output the reconstructed LR image 102, motion information (DEC motion information) 108, and quantization parameter 114 generated thereby, to frame memory 307, to data memory 308, and to data memory 309, respectively. The frame memory 307, data memory 308, and data memory 309 store the reconstructed LR image 102, DEC motion information 108, and quantization parameter 114, respectively, and output them to the resolution conversion-encoding part 306. The details of the block division, coding process, and (local) decoding process are described, for example, in "MPEG-4 Video Verification Model version 18.0," Output document of MPEG Pisa Meeting, January 2001 (hereinafter referred to as Reference Document 1).

The DEC motion information 108 consists of a prediction type and a motion vector (the motion vector in the DEC motion information will be referred to hereinafter as "DECMV"), is determined for each coding block, and is then coded.

The prediction type and DECMV in the DEC motion information will be described using FIG. 2(a). The prediction types are classified in an inter mode in which a motion prediction is carried out using a motion vector, and an intra mode in which a spatial prediction is carried out using coded pixels in a current frame without use of a motion vector. Furthermore, the inter mode includes: a forward motion prediction to perform a temporal prediction using an LR image 920a of a coded frame in the past in terms of a display time with respect to an LR image 910 of the current frame as a reference image; a backward motion prediction to perform a temporal prediction using an LR image 920b of a coded frame in the future in terms of a display time with respect to an LR image 910 of the current frame as a reference image; and a bidirectional prediction to perform temporal predictions using the both images as respective reference images and to synthesize a predicted image by interpolation. In FIG. 2(a), 922a indicates a predicted block in the forward prediction, 921a a forward DECMV, 922b a predicted block in the backward prediction, 921b a backward DECMV, 924a and 924b predicted blocks before interpolation in the bidirectional prediction, and 923a and 923b a forward DECMV and a backward DECMV in the bidirectional prediction.

The resolution conversion-encoding part 306 will be described using FIGS. 4 and 5. The resolution conversion-encoding part 306 has resolution enhancement processor 310, subsidiary data generator 351, subsidiary data encoding-rate controller 311, and frame memory 315. The subsidiary data generator 351 has low-resolution motion compensator 312, super-resolution motion compensator 313, and high-resolution motion compensator 314. The low-resolution motion compensator 312 generates LR motion information 109 (described later) as subsidiary data, the super-resolution motion compensator 313 generates modified SR motion information 111 (described later) as subsidiary data, and the high-resolution motion compensator 314 generates HR motion information 112 (described later) as subsidiary data.

The resolution conversion-encoding part 306 performs a local resolution enhancement process using input data of a plurality of reconstructed LR images, DEC motion information (including DECMV), and quantization parameters generated by the encoding processor 304 and the decoding processor 305. In the resolution conversion-encoding part 306, the resolution enhancement processor 310 generates reconstructed HR image 106 by the local resolution enhancement process, and the original HR image 101 and original LR image 104 are inputted thereto from the outside. Using these images and information, the resolution conversion-encoding part 306 generates subsidiary data to assist the resolution enhancement process, and the subsidiary data encoding-rate controller 311 carries out a coding process of the subsidiary data (i.e., generation of subsidiary data 113).

In the present embodiment, the subsidiary data 113 is generated using the reconstructed HR image 106, SR motion information (super resolution motion information) 110, quantization parameter 114, original HR image 101, and original LR image 104. The super resolution motion information refers to motion information representing time-space correspondences between the reconstructed HR image and a plurality of LR images.

The internal configuration of resolution conversion-encoding part 306 will be described with reference to FIG. 4. The processing of the resolution conversion-encoding part 306 is carried out using information about a total of seven frames consisting of a frame on which the resolution enhancement is performed, and three frames each before and after its display time. Namely, the resolution enhancement process is executed after decoding of a frame located three frames ahead.

The resolution enhancement process and the subsidiary data coding process in the encoding apparatus 10 according to the embodiment of the present invention can be separated into seven steps. The operation will be described below according to its processing order.

In the first step, the low-resolution motion compensator 312 modifies the DEC motion information 108 into high-accuracy LR motion information 109, using the original LR image 104. The LR motion information consists of block location information on an LR image and a subsidiary motion vector (the motion vector in the LR motion information will be referred to hereinafter as an "LRMV"). The low-resolution motion compensator 312 receives input of a total of three reconstructed LR images 102 consisting of a reconstructed LR image on which the resolution enhancement is performed, and reconstructed LR images both before and after it (reference images for motion prediction in video coding), three original LR images 104 corresponding to three reconstructed LR images 102, and DEC motion information 108 and outputs the LR motion information 109 to the subsidiary data encoding-rate controller 311 and to the resolution enhancement processor 310.

The LR motion information will be described using FIG. 2(b). The LR motion information is classified under a type of newly adding a subsidiary motion vector (LRMV) to a block without a DECMV, and a type of handling a block with a DECMV and changing its value into a subsidiary motion vector (LRMV) which differs from DECMV.

In the type of adding an LRMV, a motion search is performed on a block 915a without a DECMV between an original LR image 910 being a frame on which the resolution enhancement is performed and a reconstructed LR image 920a being a reference image of a previous frame. Then a motion vector to minimize an evaluated value (e.g., the sum of squared errors of pixels in a block) is detected as an LRMV. In FIG. 2(b), block 926a on the reconstructed LR image 920a of the previous frame provides the minimum evaluated value and a corresponding motion vector LRMV 925a is detected. If the minimum evaluated value is larger than a preset threshold, it is determined that the motion vector of the block is not valid, and the addition of LR motion information is not conducted. If the minimum evaluated value is smaller than the threshold, the LR motion information 109 with the detected motion vector as an LRMV is outputted to the subsidiary data encoding-rate controller 311 and to the resolution enhancement processor 310.

On the other hand, in the type of change into an LRMV, a motion search is performed on block 915b with a DECMV between the original LR image 910 being the frame on which the resolution enhancement is performed and an original LR image 920b which is an original version of the reference image. Then a motion vector to minimize the evaluated value (e.g., the sum of squared errors of pixels in a block) is detected. In FIG. 2(b), block 926b on the LR image 920b of a subsequent frame provides the minimum evaluated value and a corresponding motion vector 925b is detected. This motion vector is compared with the DECMV, and when the difference between them is larger than a preset threshold, the LR motion information 109 with the detected motion vector as an LRMV is outputted to the subsidiary data encoding-rate controller 311 and to the resolution enhancement processor 310.

As described hereinafter, the DECMV is used as initial data of motion information (SR motion information) indicating the time-space correspondences between a plurality of LR images and an HR image detected by the SR technology. The closer this initial data to an actual motion, the more the time for the detection of SR motion information can be reduced. Therefore, an operation time for the resolution enhancement process can be reduced by using the low-resolution motion information generated by the modification of the decoded motion information.

In the second step, the resolution enhancement processor 310 carries out a process of generating reconstructed HR image 106 and SR motion information 110. The resolution enhancement processor 310 inputs a total of seven reconstructed LR images consisting of a reconstructed LR image 102 on which the resolution enhancement is performed and three reconstructed LR images 102 (reference reconstructed LR images) each before and after it, DEC motion information 108 used for encoding of them, and LR motion information 109 to generate reconstructed HR image 106 and SR motion information 110.

FIG. 5 shows the internal configuration of the resolution enhancement processor 310. First, initial data generator 405 generates initial data for the resolution enhancement process. Specifically, the initial data generator 405 inputs the DEC motion information 108 and LR motion information 109 and calculates the initial data for motion vectors in SR motion information 110 to be detected by the resolution enhancement processor 310.

The SR motion information will be described below. The SR motion information consists of a frame number of a reconstructed LR image and motion vectors (a motion vector in the SR motion information will be referred to hereinafter as an "SRMV"). As described in the Background Art, in order to carry out the resolution enhancement process using the SR technology, it is necessary to detect the motion vector (SRMV), using the reconstructed HR image as a reference image, for each pixel on the six reference reconstructed LR images. One pixel on an original LR image can be generated by performing low-pass filtering and down-sampling on several pixels on an original HR image.

The SRMV will be described using FIG. 2(c). Each square represents a pixel. Let us focus attention on a pixel 927 on one reconstructed LR image 920 out of the six reference reconstructed LR images. The pixel 927 is assumed to correspond to a pixel block 942 consisting of a pixel 941 corresponding to the pixel 927, and eight pixels around it, on reconstructed HR image 940. In this case, a predicted pixel 945 for the pixel 927 can be calculated by applying the low-pass filtering and down-sampling to a pixel block 944 consisting of nine pixels detected with nine motion vectors from the pixel block 942 on the reconstructed HR image. Therefore, SRMVs 943 of the pixel 927 are nine motion vectors to minimize the error between pixel 927 and predicted pixel 945.

Figure 1:
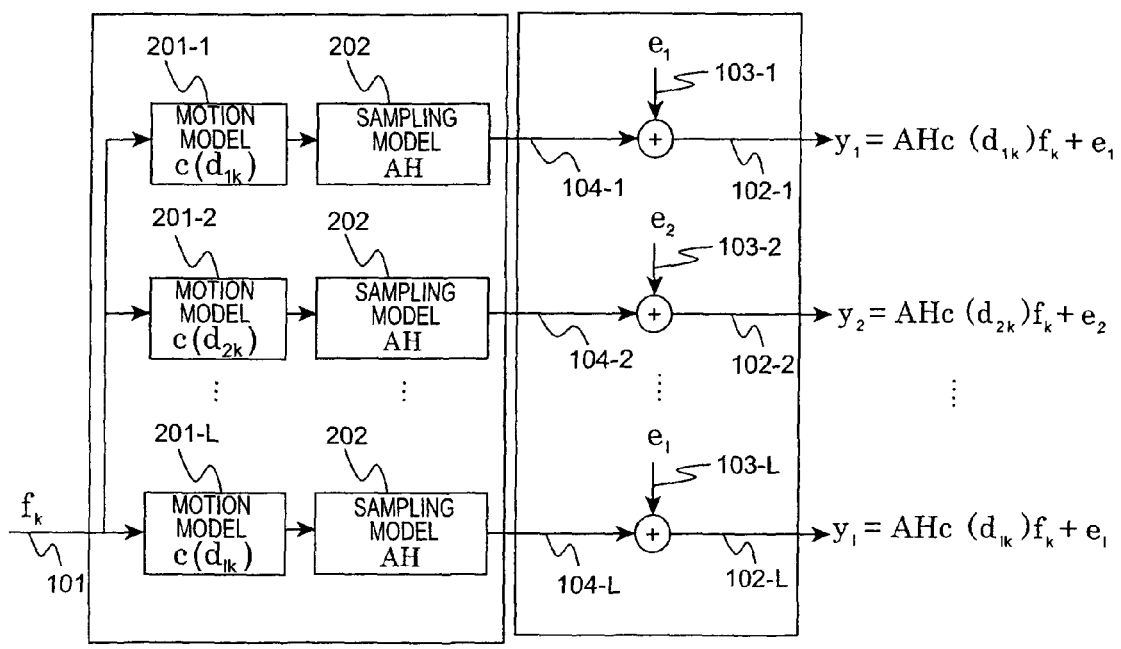
FIG. 1 is an illustration showing the relationship between a plurality of reconstructed low-resolution images and a high-resolution image.

In the present embodiment the initial data generator 405 calculates initial values of nine SRMVs necessary for a prediction of one pixel on the reconstructed LR image, for all the pixels on the six reference reconstructed LR images. As shown in FIG. 1, LR images are generated by performing the low-pass filtering and the down-sampling on an HR image. For this reason, correspondences between all the pixels on one reference reconstructed LR image and the reconstructed HR image can be determined by detecting corresponding points to the reconstructed HR image as initial values of SRMVs, for pixels on an image (reference HR image) resulting from enhancement of the reference reconstructed LR image into the HR image size. Namely, among the initial SRMVs of nine-pixel block 944 necessary for a prediction of one pixel on the reconstructed LR image, each MV overlapping with an initial SRMV of an adjacent pixel on the reconstructed LR image has the same value.

Supposing the reconstructed LR image 920 in FIG. 2(c) is a frame immediately before the reconstructed HR image 940, the reconstructed LR image 920a in FIGS. 2(a) and (b) corresponds to the image 920, and the reconstructed LR image 910 to the LR image before the resolution enhancement of the reconstructed HR image 940. Corresponding points between pixels on the image 920a and the image 910 are determined by tracing the DECMVs or LRMVs of the reconstructed LR image 910 with use of the reconstructed LR image 920a as a reference image in the reverse direction (direction from image 920a to image 910). On this occasion, a corresponding point is calculated by spatial interpolation of a motion vector, for each pixel without a coincident corresponding point. Furthermore, the motion vectors in LR image units corresponding to the corresponding points are extended to motion vectors in HR image units.

Next, corresponding points between pixels on a reconstructed LR image of a frame immediately before the image 920a, and the image 920a are determined by tracing the DECMVs or LRMVs of the reconstructed LR image 920a with use of the reconstructed LR image of the frame immediately before the image 920a, as a reference image, in the reverse direction. On this occasion, for each pixel without coincident correspondence, a corresponding point is determined by spatial interpolation of a motion vector. Furthermore, corresponding points between the pixels on the reconstructed LR image of the frame immediately before the image 920a, and the image 910 are calculated from the corresponding points between image 910 and image 920a and the corresponding points between image 920a and the frame immediately before the image 920a, and the motion vectors in LR image units corresponding to the corresponding points are extended to motion vectors in HR image units. This process is continuously carried out in the direction away from the reconstructed HR image 940, for all the six reference reconstructed LR images, thereby generating the initial data of the SRMV search.

Next, super-resolution image synthesizer 410 generates a reconstructed HR image 106. The super-resolution image synthesizer 410 inputs seven reconstructed LR images 102, the initial data for the SRMV search generated by the initial data generator 405, and quantization parameter 114, carries out a process of iterating optimization of SR motion information 110 by motion searcher 411 and optimization of reconstructed HR image 106 by coding noise estimator 412, and outputs the SR motion information 110 and reconstructed HR image 106 (for the details of the optimization using the iterating process, reference is made, for example, to Non-patent Document 1).

In the third step, the super-resolution motion compensator 313 modifies the SR motion information 110 into high-accuracy modified SR motion information 111, using original images. The super-resolution motion compensator 313 inputs six original LR images 104 which are the original version of six reference reconstructed LR images, seven original HR images 101 which are original version of six reference reconstructed LR images and one reconstructed LR image on which the resolution enhancement is performed, and the SR motion information 110, and outputs the modified SR motion information 111 to the resolution enhancement processor 310 and to the subsidiary data encoding-rate controller 311.

The modified SR motion information consists of block location information on a reconstructed LR image, a reference frame number, a block size, and subsidiary motion vectors (the motion vectors in the modified SR motion information will be referred to hereinafter as "modified SRMVs"). The block size is used for a purpose of reducing the number of codes of subsidiary data by joint coding of several pixels. The number of modified SRMVs belonging to the modified SR motion information is 9 in the case where the block size is 1×1 pixel, and (2×N+1)×(2×N+1) in the case where the block size is N×N pixels.

The super-resolution motion compensator 313 uses the six original LR images and the original HR image to detect SRMVs between pixels on the six reference reconstructed LR images and the original HR image. Furthermore, if a difference between a target pixel on an original LR image and a predicted pixel thereof is larger than a preset threshold, SRMVs are detected between original HR images, without performing the sampling process based on the low-pass filtering and down-sampling. Differences between the detected SRMVs and the input SRMVs are compared by average in each unit of several types of divided blocks specified, and when a difference is larger than a threshold, an average of detected SRMVs and constituent data are outputted as the modified SR motion information 111. Even if the difference of SRMVs is smaller than the threshold and if the sum of the block squared error of differences between predicted pixels in application of the detected SRMVs and the input SRMVs and pixels on the original LR image is larger than a threshold, the average of detected SRMVs and constituent data are outputted as the modified SR motion information 111. The modified SRMVs improve the estimation accuracy of corresponding points between the reconstructed LR images and the HR image which is the enhanced by the resolution enhancement, and thus improve the image quality of the reconstructed HR image. In addition, the time is reduced for the detection of SRMVs, whereby the operation time is reduced for generation of the super-resolution image.

In the fourth step, the resolution enhancement processor 310 readjusts the reconstructed HR image 106 and SR motion information 110. The resolution enhancement processor 310 inputs a reconstructed LR image 102 on which the resolution enhancement is performed, reconstructed LR images 102 consisting of three frames before it and three frames after it, and modified SR motion information 111, updates the reconstructed HR image 106 and SR motion information 110, and outputs the updated data. Specifically, the super-resolution image synthesizer 410 replaces SRMVs with modified SRMVs, and thereafter performs a process of iterating the optimization of SR motion information 110 by the motion searcher 411 and the optimization of reconstructed HR image 106 by the coding noise estimator 412, to update the SR motion information 110 and reconstructed HR image 106 (for the details of the optimization using the iterating process, reference is made, for example, to Non-patent Document 1).

In the fifth step, the high-resolution motion compensator 314 generates motion information for further improvement in the image quality of the reconstructed HR image, using reconstructed HR images (reference HR images) of three preceding frames already generated, and the original HR image. The high-resolution motion compensator 314 inputs a plurality of reference HR images 107, a reconstructed HR image 106, and an original HR image 101 being an original image of the reconstructed HR image, and outputs HR motion information 112 between the reference HR images 107 and the reconstructed HR image 106 to the resolution enhancement processor 310 and to the subsidiary data encoding-rate controller 311.

The HR motion information consists of block location information on a reference HR image, a reference frame number, a block size, and a subsidiary motion vector (the "motion vector" in the HR motion information will be referred to hereinafter as an HRMV).

The HRMV will be described using FIG. 2(d). FIG. 2(d) shows a case where a block 946 on a reconstructed HR image 940 is updated by a block 952 on a reference HR image 950 of a frame immediately before it, and shows that a spatial motion vector between a block 951 at the same spatial position as the block 946, on the reference HR image 950, and the update block 952 becomes HRMV 954. The block size is used for the purpose of reducing the number of coding bits for subsidiary data by joint coding of multiple pixels.

The high-resolution motion compensator 314 first compares the original HR image with the reconstructed HR images as to several types of divided blocks preliminarily specified, to detect a block in which the sum of the squared error of differences of pixels is larger than a preset threshold. Next, the high-resolution motion compensator 314 extracts a block at a detected position from the original HR image, and searches the plurality of reference HR images for finding a block position where the sum of the squared error of differences from the extracted block is minimum. If the sum of the squared error of differences between the block obtained as a result of the search and the extracted block is smaller than the threshold, the high-resolution motion compensator 314 outputs corresponding HR motion information 112. This HR motion information using the information of the original high-resolution image enables the image quality of the reconstructed high-resolution image to be modified using the reference high-resolution images with high quality enhanced in resolution in the past, whereby the image quality of the reconstructed HR image is improved.

In the sixth step, the resolution enhancement processor 310 carries out a quality improving process of the reconstructed HR image 106. The resolution enhancement processor 310 inputs the reference HR image 107 and HR motion information 112, updates the reconstructed HR image 106, and outputs the updated data. Specifically, motion compensator 421 of quality sharpener 420 in FIG. 5 extracts a block image one by one from the reference HR image 107 on the basis of the HR motion information 112, and quality improver 422 synthesizes a reconstructed HR image from extracted block images. This is carried out for every HR motion information and an updated reconstructed HR image 106 is outputted. The synthesis method applied herein is weighted interpolation with a corresponding block on the old reconstructed HR image.

In the seventh step, the subsidiary data encoding-rate controller 311 encodes the LR motion information 109 being subsidiary information generated by the subsidiary data generator 351, the modified SR motion information 111, and the HR motion information 112 to generate subsidiary data 113, and outputs the subsidiary data 113 to decoding apparatus 20.

FIG. 8 shows a data format of the subsidiary data associated with one reconstructed HR image. The subsidiary data 113 as a target for coding by the subsidiary data encoding-rate controller 311 starts from start code 701 for a search for a head of subsidiary data of one frame. The start code is a unique word whose data pattern does not appear in the subsidiary data. Synchronization code 707 is a unique word for discriminating the subsidiary data of one frame in each of data types described hereinafter, and is omitted immediately after the start code. Information from data type 702 to motion vector 705 is encoded by variable-length coding (for the variable-length coding, reference is made to Reference Document 1).

Block location information 703 indicates a reference frame number and a pixel position on an image (an LR image for the LR motion information and modified SR motion information, or an HR image for the HR motion information). Where the data type is the LR motion information, the reference frame number is determined from the DEC motion information, and thus only the information of the pixel position is encoded.

Block size information 704 indicates a size of a block having the aforementioned pixel position at the upper-left. Motion vector density information 708 indicates a pixel interval of a subsidiary motion vector to be encoded, for the foregoing block range. Therefore, a plurality of subsidiary motion vectors are encoded through iterative loop 712, except for the case where the pixel interval is 0, i.e., where there is one subsidiary motion vector to be encoded in the block. Each motion vector is encoded in order of a horizontal component and a vertical component of vector values of an LRMV, modified SRMV, or HRMV. Each motion vector encoded in fact is a difference vector from a predicted motion vector.

For each LRMV, predicted values for a block without a DECMV are median values of motion vector components of three adjacent blocks (for the intermediate value prediction of motion vector, reference is made to Reference Document 1); predicted values for a block with a DECMV are vector values of the DECMV. For each modified SRMV or HRMV, predicted values are intermediate values of motion vector components of three adjacent blocks with respect to motion vectors of the same data type.

If the volume of information to be coded is high, the subsidiary data encoding-rate controller 311 reduces the information volume according to priority levels. If the first priority is speed, the priority levels are determined in an order of the LR motion information, modified SR motion information, and HR motion information. If the first priority is the image quality of the reconstructed HR image, the priority levels are determined in an order of the HR motion information, modified SR motion information, and LR motion information. In the same data type, a higher priority is given to a block with a large evaluated value (LR motion information: difference from DECMV; modified SR motion information: difference from SRMV; HR motion information: sum of squared error of pixel units between an extracted block from a reference SR image and a corresponding block on a reconstructed HR image).

Subsequently, the decoding apparatus 20 according to an embodiment of the present invention will be described.

FIG. 6 shows an overall configuration of the decoding apparatus 20 according to an embodiment of the present invention. The decoding apparatus 20 has decoding processor 501, resolution enhancement processor 502, frame memory 503, data memory 504, data memory 505, frame memory 508, and subsidiary data decoding-separating part 531.

First, the decoding processor 501 decodes encoded video data 120 into reconstructed LR image 102. The reconstructed LR image 102 thus decoded is stored into frame memory 503, decoded motion information (DEC motion information) 108 into data memory 504, and decoded quantization parameter 114 into data memory 505, and each data is outputted according to a request from the resolution enhancement processor 502. The details of the decoding process are described, for example, in "Text of ISO/IEC 14496-2 Third Edition," March 2003 (hereinafter referred to as Reference Document 2). The resolution enhancement processor 502 inputs reconstructed LR image 102, DEC motion information 108, quantization parameter 114, subsidiary information obtained by decoding subsidiary data 113 (LR motion information 109, modified SR motion information 111, and HR motion information 112 decoded and separated by the subsidiary data decoding-separating part 531), and reference HR image 107 (previously generated, reconstructed HR image outputted from the frame memory 508), and generates reconstructed HR image 106.

FIG. 7 shows the internal configuration of the resolution enhancement processor 502 and the subsidiary data decoding-separating part 531. The resolution enhancement processor 502 requests input of reconstructed LR image 102, DEC motion information 108, quantization parameter 114, decoded subsidiary data 113, and reference HR image 107 (reconstructed HR image already generated). On this occasion, the reconstructed LR image and DEC motion information needed are information about a total of seven frames consisting of a frame on which is the resolution enhancement is performed, and three frames each before and after it in terms of the display time, and the reference HR image needed is information about three preceding frames. Namely, the resolution enhancement process is carried out after a reconstructed LR image of a third frame ahead from the current frame is decoded.

The resolution enhancement process in the decoding apparatus 20 according to the embodiment of the present invention can be decomposed into three steps. The operation will be described below according to the processing sequence.

The first step is to perform decoding of LR motion information 109 and to generate initial data for SRMV search. First, the subsidiary data decoding-separating part 531 separates data of LR motion information 109 from the subsidiary data 113 of a target frame for resolution enhancement and decodes it by variable-length decoding. Next, initial data generator 405 inputs the decoded LR motion information 109 and DEC motion information 108 of seven frames, and generates the initial data for SRMV search. The operation of the initial data generator 405 was already described with FIG. 5 and thus the description thereof is omitted herein.

The second step is to decode the modified SR motion information 111 and to generate the reconstructed HR image 106. First, the subsidiary data decoding-separating part 531 separates the data of modified SR motion information 111 from the subsidiary data 113 of the target frame for resolution enhancement, and decodes it by variable-length decoding. Next, super-resolution image synthesizer 510 inputs the decoded modified SR motion information 111, seven reconstructed LR images 102, the initial data for SRMV search, and quantization parameter 114, and generates reconstructed HR image 106. Specifically, motion searcher 511 modifies the initial data for SRMV search by the modified SR motion information 111, and thereafter carries out a process of iterating the optimization of SRMV by motion searcher 511 and the optimization of reconstructed HR image 106 by coding noise estimator 512, to converge the reconstructed HR image 106 (for the details about the optimization using the iterating process, reference is made, for example, to Non-patent Document 1). It is, however, estimated that an SRMV modified by the modified SR motion information has highly accurate values, and thus only fine adjustment is carried out in a limited range of real numbers of not more than integer pixels.

The third step is to perform decoding of HR motion information 112 and a quality improving process of reconstructed HR image 106. First, the subsidiary data decoding-separating part 531 separates the data of HR motion information 112 from the subsidiary data 113 of the target frame for resolution enhancement, and decodes it by variable-length decoding. Next, image sharpener 520 carries out the quality improving process using the HR motion information 112 and reference HR image 107. Specifically, motion compensator 521 extracts a block image one by one from the reference HR image 107 on the basis of the HR motion information 112, and quality improver 522 combines each extracted block image with the reconstructed HR image 123 generated by the super-resolution image synthesis processor 510 to update the reconstructed HR image 106. This is carried out for every HR motion information and the reconstructed HR image 106 thus updated is outputted. The synthesis method applied herein is the weighted interpolation with a corresponding block on the old reconstructed HR image.

FIG. 9 shows an encoding process flow to carry out the present invention. Since the details of each step in FIG. 9 are redundant with the descriptions with FIGS. 3, 4, and 5, only the flow of processing will be described below. After encoding process start 601, process 602 is to convert an original HR image into original LR images by the sampling process based on the low-pass filtering and down-sampling. Process 603 is to perform video coding of each converted original LR image and to generate a reconstructed LR image and DEC motion information by the local decoding process. Process 604 is to modify at least part of the DEC motion information into high-accuracy LR motion information, using the original LR image. Process 605 is to generate the initial data for SRMV search, using the DEC motion information and LR motion information of multiple frames. Process 606 is to generate the reconstructed HR image and SR motion information from a plurality of reconstructed LR images by the resolution enhancement process. Process 607 is to modify part of the SR motion information generated in process 606, into high-accuracy modified SR motion information, using the original HR image and original LR image. Process 608 is to replace SRMVs with the modified SRMVs generated in process 607 and to again carry out the resolution enhancement process to update the reconstructed HR image and SR motion information. Process 609 is to detect the motion information (HR motion information) between a reference HR image and a reconstructed HR image for improvement in the image quality of the target reconstructed HR image with the reference HR image, using the reference HR image. Process 610 is to improve the image quality of the reconstructed HR image, using the HR motion information detected in process 609, and the reference HR image. Process 611 is to encode the LR motion information generated in process 604, the modified SR motion information generated in process 607, and the HR motion information generated in process 609, to generate subsidiary data. After completion of process 611, the encoding process ends (process 612).

FIG. 10 shows a super-resolution image generating process flow in the decoding process to carry out the present invention. Since the details of each step in FIG. 10 are redundant with the description of FIG. 7, only the flow of processing will be described below. After super-resolution image generating process start 801, process 802 is to decode the LR motion information. Process 803 is to generate the initial data for SRMV search, using the LR motion information decoded in process 802 and the DEC motion information of multiple frames. Process 804 is to decode the modified SR motion information. Process 805 is to set the modified SR motion information decoded in process 804, as initial data for SRMV search and to perform a search for SRMV under a condition that the update of the modified SR motion information is limited in the range of not more than integer pixels, to generate the reconstructed HR image from reconstructed LR images of multiple frames. Process 806 is to decode the HR motion information. Process 807 is to improve the image quality of the reconstructed HR image from the reference HR image, based on the HR motion information decoded in process 806. After completion of process 807, the super-resolution image generating process ends (process 808).

FIG. 11 shows a decoding process flow to carry out the present invention. Since the details of each step in FIG. 11 are redundant with the descriptions of FIGS. 6 and 7, only the flow of processing will be described below. After decoding process start 901, process 902 is to decode encoded video data to generate the reconstructed low-resolution image, DEC motion information, and quantization parameter. Next, process 903 is to carry out decoding of subsidiary data coded, to generate the LR motion information, modified SR motion information, and HR motion information. Thereafter, process 904 is to generate the initial data for SRMV search, using the LR motion information decoded in process 903 and the DEC motion information of multiple frames. Process 905 is to set the modified SR motion information decoded in process 903, as initial data for SRMV search and to perform a search for SRMV under a condition that an update of modified SR motion information is limited in the range of not more than integer pixels, to generate a reconstructed HR image from reconstructed LR images of multiple frames. Process 906 is to improve the image quality of the reconstructed HR image from the reference HR image, based on the HR motion information decoded in process 903. After completion of process 906, the decoding process ends (process 907).

FIG. 12 is an illustration for explaining a case where a computer system carries out a program of the image encoding process or image decoding process of the above embodiment, using a storage medium such as a flexible disk storing the program.

FIG. 12(b) shows the appearance from the front of a flexible disk, a sectional structure thereof, and a flexible disk, and FIG. 12(a) shows an example of a physical format of a flexible disk which is a main body of a recording medium. The flexible disk FD is built in case F, a plurality of tracks Tr are formed concentrically from outer periphery toward inner periphery on a surface of the disk, and each track is circumferentially divided into sixteen sectors Se. Therefore, in the case of the flexible disk storing the above program, data as the program is recorded in an allocated region on the flexible disk FD.

FIG. 12(c) shows a configuration for carrying out recording/reproduction of the above program on the flexible disk FD. For recording the program onto the flexible disk FD, the data as the program is written from a computer system Cs through a flexible disk drive. In a case where the encoding or decoding apparatus is constructed based on the program in the flexible disk in the computer system, the program is read out of the flexible disk by the flexible disk drive and is transferred to the computer system.

The above described the use of the flexible disk as a data recording medium, but the same also applies to use of an optical disk. The recording media do not have to be limited to this, but the invention can also be carried out in the same manner, using any recording medium capable of recording the program, such as an IC card or a ROM cassette. The computer encompasses a DVD player, a set-top box, a cell phone, etc. with a CPU configured to perform processing and control based on software.

The above described the embodiments of the present invention, but it is noted that the following modifications are also available and all the modes described below are also included in the present invention.

(1) Modification Example Concerning Partial Use of Function

The LR motion information, the modified SR motion information, the HR motion information, which is the subsidiary motion information forming the subsidiary data of the present invention, does not have to be present all together, but the same effect can also be achieved even if the high-resolution image is generated from low-resolution images, using only part of the subsidiary motion information.

Specifically, even if the subsidiary data of the present invention is generated using both or one of the original HR image with the resolution higher than that of the original LR images, and the original LR images, the image decoding apparatus and the image encoding apparatus are able to improve the accuracy of motion detection between images and to improve the image quality of the reconstructed high-resolution image. Since it reduces the processing load of the motion search in the image decoding apparatus and the image encoding apparatus, the computational complexity can be reduced for the image resolution enhancement process.

Specifically, the image decoding apparatus and the image encoding apparatus of the present invention realize the improvement in the image quality and the reduction in the computational complexity as described above, in any one of a case where the subsidiary data consists of only the modified SR motion information, a case where the subsidiary data consists of the modified SR motion information and the HR motion information, and a case where the subsidiary data consists of the modified SR motion information, the HR motion information, and the LR motion information. The configurations not using part of the subsidiary motion information can be realized in such a manner that the subsidiary data generator 351 of the image encoding apparatus 10 does not carry out the generation of the motion information corresponding to the associated subsidiary motion information.

The super-resolution image synthesis process in FIGS. 5 and 7 can be carried out without the initial data for SRMV search. Therefore, the modified SR motion information and the HR motion information of the present invention are also effective in cases where the initial data generation and the coding of LR motion information are not carried out.

Furthermore, the reconstructed HR image generated by the super-resolution image synthesis process in FIGS. 5 and 7 can also be implemented without the quality improving process of the reconstructed HR image based on the image sharpening process. Therefore, the LR motion information and the modified SR motion information of the present invention is also effective in cases where the image sharpening process and the coding of HR motion information are not carried out.

In addition, the subsidiary data of the present invention is also effective even in cases where a super-resolution image with a higher resolution is generated from a plurality of images acquired through a means such as a camera or from a plurality of images preliminarily stored in a device such as a hard disk, instead of the decoded images from the encoded video data. In such cases, the DEC motion information does not exist, but the modified SR motion information and the HR motion information is effective.

(2) Modification Example Concerning Change in Definition of Function

The method of combining a block on a reference HR image extracted in the image sharpening process, with the reconstructed HR image is not limited to the weighted synthesis process. The HR motion information of the present invention is also effective in cases where a portion of the reconstructed HR image is replaced with an extracted block.

There are no restrictions on the type of the low-pass filter for the conversion from HR image to LR image. In the description of FIG. 2(c), the number of taps of the filter is three both horizontal and vertical, but it is also effective to use a filter with the greater number of taps or with different coefficients. In addition, it is described that nine pixels on the HR image correspond to one pixel on the LR image, but there are no restrictions on this correspondence. Specifically, since one pixel on the LR image can be generated from at least one corresponding pixel on the HR image, the operation can be achieved without some of the pixels in the region affected by the filter. Furthermore, FIG. 2(c) shows the example wherein the pixels discarded by down-sampling are pixels on even columns and even lines in the HR image after the filtering process, but the discarded pixels are not limited to this example. The present invention is also effective in cases where samples at fractional positions on the HR image are adopted as pixel samples on the LR image in the low-pass filtering process.

Furthermore, the initial data generating method for SRMV search is not limited to the method described with FIG. 5. Instead of the tracing method in the direction away from the reconstructed HR image, another effective method is to perform scaling of the motion vector according to the frame interval.

(3) Modification Example Concerning Encoding Method of Subsidiary Data

The data format of subsidiary data as an object for coding of the present invention is not limited to that in FIG. 8. The motion vector predicting method is not limited to the method described with FIG. 8, either.

In the data format of FIG. 8, instead of the method of using the reference frame number information as the block location information and encoding the pixel positions, it is also effective to adopt a method of dividing an image into blocks and encoding the information indicating whether subsidiary motion information in a block is encoded or not in the raster scan order from upper-left block. At this time, the block size information is not always necessary.

Furthermore, in the data format of FIG. 8, it is also effective to replace the block location information with the reference number information in the block location information, and to adopt a method of dividing an image into blocks and encoding the information indicating whether the motion vector in a block is encoded or not in the raster scan order from upper-left block, instead of the method of encoding the pixel position information in the block location information, block size information, and motion vector density information.

In the data format of FIG. 8, the data type information is encoded for each frame, but another conceivable case is to delete the iterative loop 713 and to encode a data type for each block in the subsidiary data information. Since this format is to add a synchronization code for each subsidiary motion information of one block, it is effective in cases where a search is desired for the subsidiary motion information of a specific pixel from the subsidiary data.

Furthermore, there are no restrictions on the accuracy of coding of the motion vector. For example, it is also effective to adopt the high-accuracy motion vector described, for example, in Reference Document 2 or in "Text of ISO/IEC 14496-10 Advanced Video Coding 3rd Edition," September 2004 (hereinafter referred to as Reference Document 3).

The description of FIG. 8 provided the operation in which the components of subsidiary data were encoded by the variable-length coding, but the method for coding of it is not limited to this. It is also effective to adopt the arithmetic coding method or the like described in Reference Document 3.

(4) Modification Example Concerning Components of Subsidiary Data

The components of subsidiary data are not limited to those in the aforementioned embodiment.

The subsidiary motion vector information of FIG. 8 also includes an information which indicates no corresponding motion vector between two images exits. A situation wherein pixels in two any images in a video sequence are perfectly in one-to-one correspondence is an extremely rare case, and thus information indicating no corresponding point is effective.

Furthermore, the subsidiary motion vector information of FIG. 8 also can include information which indicates motion search range for the area defined by block size information, instead of vector values. In this case, the motion vector density information is omitted. This search range information can reduce the detection time of the motion vector.

The subsidiary motion vector information of FIG. 8 is also effective in the case of motion parameters indicating rotation, expansion, deformation, etc., instead of the vector values. The details of the motion parameters (affine transformation parameters and projective transformation parameters) are described in Reference Document 1.

Furthermore, FIG. 2(*b*) shows the configuration wherein the prediction type of LR motion information is limited to the prediction type of DEC motion information or default value, but the prediction type is not limited to those. In this case, the LR motion information can include a prediction type (forward prediction/backward prediction/bidirectional prediction or the like). In the case of the encoding and decoding methods to which the motion prediction using multiple reference frames is applied as described in Reference Document 3, the DEC motion information can include reference frame numbers. Furthermore, in the case of the encoding and decoding methods in which a block size for execution of the motion prediction can be selected from plural types, as described in Reference Document 3, the DEC motion information also can include the block size. In this case, similarly, the LR motion information also can include the reference frame numbers and the block size.

The SRMV does not have to be obtained for all the pixels on a reconstructed LR image. If it cannot be detected from a pixel on the reconstructed HR image by virtue of influence of occlusion or the like, a more effective reconstructed HR image can be generated by the optimization process without use of the pixel.

Furthermore, as to the block location information in the modified SR motion information, it is also effective to use values on the basis of the reconstructed HR image, instead of the values on the basis of the reconstructed LR image. In this case, where the motion density information is 1 (i.e., where the motion vector is encoded for all the pixels in a block), the number of pixels in the block is same as the number of modified SRMVs in pixel units.

The shape of the block of the subsidiary motion information may be arbitrary. In this case, shape information may be coded. One of the coding methods of the shape information is, for example, the method using the arithmetic coding described in Reference Document 2.

(5) Modification Example Concerning Motion Estimation Method

In the above embodiment the detection of modified SRMV is carried out between a plurality of original LR images and an original HR image, but another method of carrying out the detection using an HR image instead of the original LR image is also highly effective because it improves the accuracy of SRMV. In this case, the pixel position in the block location information is values on the HR image.

In the above embodiment the detection of SRMV is carried out between a plurality of reconstructed LR images and a reconstructed HR image, but another method of carrying out the detection using reference HR images instead of the reconstructed LR images is also highly effective because it improves the accuracy of SRMV.

(6) Modification Example Concerning Overall Configuration

The above embodiment employed the encoding and decoding methods of video sequence as described in Reference Document 1 and Reference Document 2, but the methods are not limited to those.

The above described the resolution enhancement method and estimation model based on Non-patent Document 1 and Non-patent Document 2, but the present invention is not limited to this method because the subsidiary motion information coding and the high quality achieving process using it according to the present invention can be applied to the technology of generating the high-resolution image from the plurality of low-resolution images.

Furthermore, the above described that the number of reconstructed LR images used in the resolution enhancement process was 7, but the present invention is not limited to it because the present invention can be carried out with another number. There are no restrictions on the number of reference HR images, either.

The resolution enhancement process introduced in the present specification is the technology of formulating the relationship between one unknown high-resolution image and a plurality of known low-resolution images and estimating an optimal high-resolution image and motion information satisfying those formulae, and Non-patent Document 1 and Non-patent Document 2 are examples of the technology for estimating an optimal higher-order vector satisfying an evaluation function by statistical techniques. There are various methods of resolution enhancement, as described in Document "Sung Cheol Park et al., "Super-Resolution Image Reconstruction: A Technical Overview," IEEE Signal Processing Magazine, May 2003" (hereinafter referred to as Reference Document 4), and the subsidiary data in the present specification can be applied all to cases where the relationship between the high-resolution image and the plurality of low-resolution images is expressed using the motion information. The other methods than Non-patent Documents 1 and 2 include a method of solving a system of simultaneous equations, a method using projections onto convex sets (e.g., "A. M. Tekalp, M. K. Ozkan and M. I. Sezan, "High-resolution image reconstruction from lower-resolution image sequences and space varying image restoration," in Proc. IEEE Int. Conf. Acoustics, Speech and Signal Processing (ICASSP), San Francisco, Calif., vol. 3, March 1992, pp. 169-172," (hereinafter referred to as Reference Document 5)), and so on. The high-resolution image generated is characterized in that the spatial resolution is higher than that of the plurality of known low-resolution images and in that high-frequency components not appearing through alignment between the plurality of low-resolution images and the synthesis process (e.g., mosaicing) are generated on the image.

The above described the configuration wherein the quantization parameter 114 was the input in the process of coding noise estimator 412 in FIGS. 5 and 7, but the present invention can also be carried out in the coding noise estimating processes without need for the quantization parameter. For this reason, implementation of the present invention is not affected by the existence of the quantization parameter in the resolution enhancement process.

The above described the configuration wherein the DEC motion information 108 consisted of the prediction type and motion vector (DECMV), but the present invention is not limited to these components. For example, in a method wherein a plurality of reconstructed LR images are used as reference images as in Reference Document 3, the DEC motion information also includes a reference frame number because it is necessary to select a reference frame number for each predicted block.

(7) Generation Method of Subsidiary Data

The above described the super-resolution motion compensator 313 in FIG. 4 in the configuration wherein if the difference between a target pixel on an original LR image and a predicted pixel thereof was larger than the preset threshold, the reference image to be used in the detection of modified SRMV was switched from the original LR image to the original HR image, but the use of the original HR image is not limited to this method. For example, the original HR image may be used for all the pixels, without use of the original LR image. Concerning the output condition of modified SR motion information 111, it was defined as follows in the description of FIG. 4: the difference between the detected SRMV and the SRMV in the SR motion information 110 is compared by average for each of several types of divided blocks specified and the modified SR motion information 111 is outputted if the difference is larger than the threshold. However, the output condition is not limited to this method. For example, instead of the difference between MVs, the output condition may also be defined so as to use the detected SRMV and the difference between the predicted value in application of SRMV and the pixel on the original image. The size selecting method of divided blocks is not limited to one method, either. Furthermore, the modified SRMV to be outputted in the description of FIG. 4 was the block average of detected SRMVs, but is not limited to this. For example, a fixed value of SRMV is determined for pixels in a block, instead of the average of detected MVs, and the detection is performed in block units.

Similarly, the subsidiary data selecting method in the low-resolution motion compensator and in the high-resolution motion compensator is not limited to one technique, either.

Furthermore, the priority levels and evaluation method associated with the selection of subsidiary motion information in the subsidiary data encoding-rate controller are not limited to the method shown in the description of FIG. 4, either. For example, the resolution enhancement process using the subsidiary data of the present invention is also effective in cases using the evaluation method with consideration to the number of coding bits.

(8) Embodiment of Modification Example (5)

The super-resolution image synthesizer 410 generates the SR motion information 110 between reconstructed HR image 106 and a plurality of reconstructed LR images by use of the plurality of reconstructed LR images 102, and an improvement in the estimation accuracy of the SR motion information and the modified SR motion information can be expected by use of the motion estimation between HR images, as in Modification Examples (4) and (5). Therefore, an embodiment of the motion estimation between HR images will be described below in detail with reference to FIGS. 13, 14, and 15. An example will be described below using a case where the resolution enhancement process requires only the SR motion information, concerning Modification Example (1).

Figure 13:
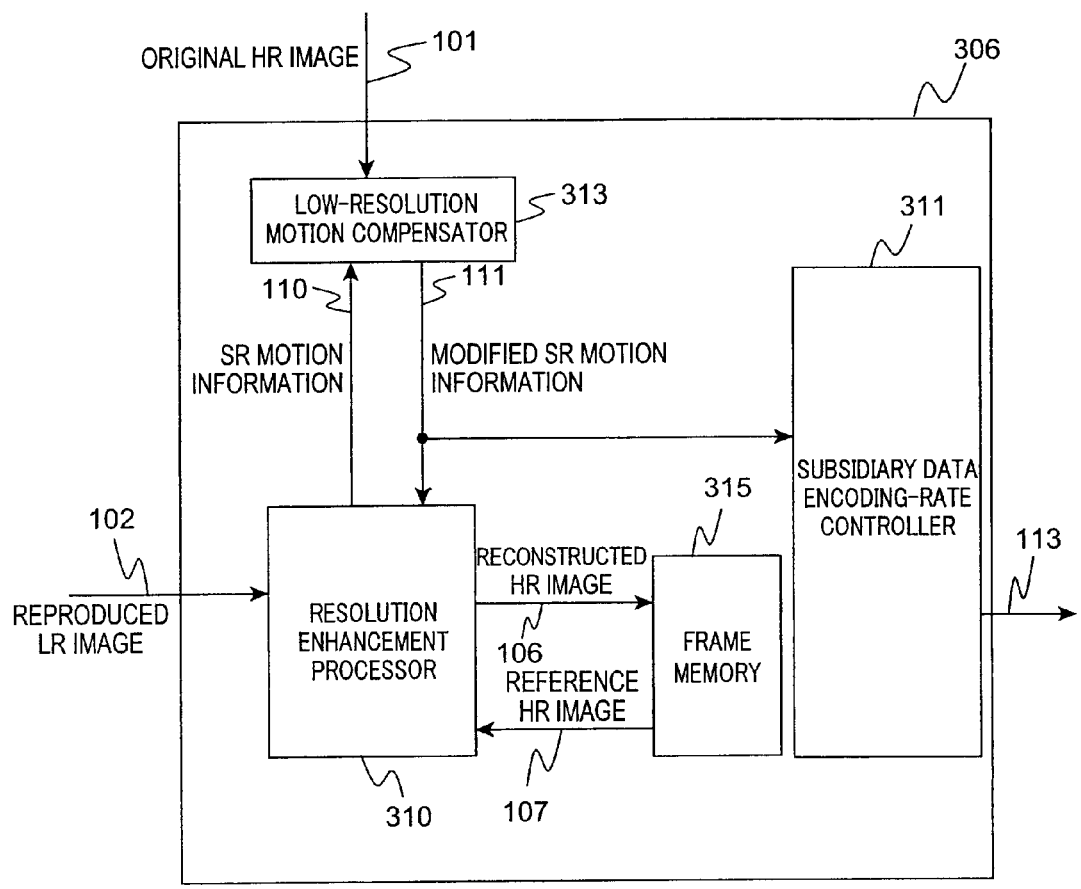
FIG. 13 is an illustration to illustrate another example of a configuration of an encoding process according to the present invention.

FIG. 13 shows an internal configuration of resolution conversion-encoding part 306, i.e., a modification example of FIG. 4. The resolution enhancement processor 310 is a processing part for generating reconstructed HR image 106 and SR motion information 110 from a plurality of reconstructed LR images 102, and an internal configuration thereof is shown in FIG. 14.

Figure 14:
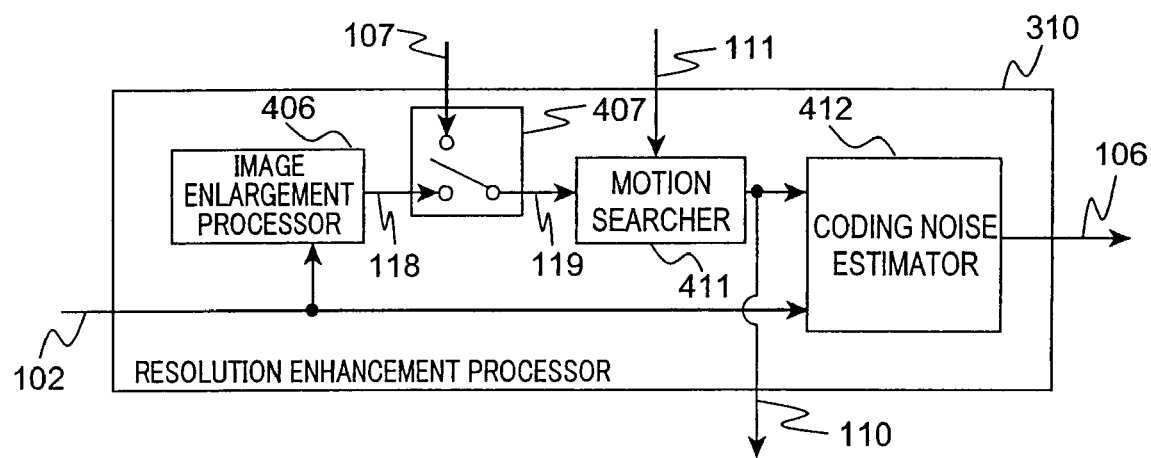
FIG. 14 is an illustration to illustrate another example of the resolution enhancement process using an encoding process according to the present invention.

FIG. 14 shows a modification example of FIG. 5. As seen from the inputs and outputs in the drawing, the configurations of the resolution enhancement processor 310 and the super-resolution motion compensator 313 are different from those in FIGS. 4 and 5. Namely, in the present invention, the method of the resolution enhancement process using the SR motion information is not limited to FIG. 5 and the method of generating the modified SR motion information is not limited to FIG. 4, either. In the description of FIG. 2(c), the SR motion information was the motion information representing the time-space correspondences between the reconstructed HR image and the plurality of LR images. For this reason, in the example of FIG. 2(c), the number of SRMVs (modified SRMVs) corresponding to one pixel on the LR image is determined by the number of taps of the low-pass filter used in the conversion from the HR image to the LR image (nine taps in FIG. 2(c)). However, the configuration of SRMVs is not limited to the configuration of FIG. 2(c), as described in Modification Examples (4) and (5), and in the present example the SR information is information representing the time-space correspondence between a reconstructed HR image and a plurality of HR images. Therefore, one SRMV (modified SRMV) corresponds to one pixel on the HR image as described in Modification Example (4).

Considering the difference between the two examples from the viewpoint of the motion models, the SRMV in FIG. 2(c) represents the time-space correspondences between the original HR image 101 and the plurality of original LR images 102, including the motion model 201 and sampling model 202 in FIG. 1, whereas the SRMV in the present example represents the motion vector of motion model 201, i.e., the time-space correspondences between the original HR image 101 and the plurality of original HR images. Since the original HR image and original LR images are unknown, the SR information is generated from the virtual HR image hypothetically produced, and the reconstructed LR image in FIG. 2(c). In contrast to it, the present example is to generate virtual HR images corresponding to the plurality of reconstructed LR images, in addition to the virtual HR image, and to generate the SR motion information by the motion estimation between HR images. Therefore, the two examples are different in the method of generating the SR motion information, and, therefore, provide different results though they are based on the same motion model. The present example is considered to improve the quality of the reconstructed HR image and the processing speed if the virtual HR images are appropriately selected. Since the motion vector between the original HR images is utilized as the modified SRMV, the introducing effect of subsidiary data is considered to be higher than that in FIG. 2(c).

In the present example, the local resolution enhancement processor 310 in FIG. 13 corresponds to the super-resolution image synthesizer 410 in FIG. 5. The local resolution enhancement processor 310 inputs a plurality of reconstructed LR images 102 as in FIG. 5, but before inputted to the motion searcher 411, they are converted into enlarged images 118 by image enlargement processor 406. There are no restrictions on the processing of the image enlargement processor 406 in the present invention, but conceivable methods include a simple linear interpolation process, a spline interpolation process using the B-spline function, a technique of improving the image quality using the image improving model as described in Non-patent Document 1 for the images enlarged by interpolation, and so on.

The resolution enhancement process is often arranged to iterate the processing of the resolution enhancement processor 310, thereby improving the quality of the reconstructed HR image. In this case, for a reconstructed LR image as a target for resolution enhancement, at the first step (first iterating process) an enlarged image 118 generated by the image enlargement processor 406 is inputted into the motion searcher 411 as virtual HR image 119. In the second and subsequent iterating processes after generation of the virtual reconstructed HR image, the reference HR image 107 (virtual reconstructed HR image) is selected as virtual HR image 119 through switch 407, instead of the enlarged image 118, and it is inputted into the motion searcher 411. Concerning the reference reconstructed LR image, there is a case where the reconstructed HR image (reference HR image 107) has already been generated by the resolution enhancement process, prior to the first iterating process. In this case, the reference HR image 107 is selected as virtual HR image 119 through switch 407. As the reference HR image 107 is utilized in this manner, we can expect such effects as an improvement in the estimation accuracy of SR motion information 110 generated by the motion searcher 411, and a reduction in the operation time of processing.

The motion searcher 411 generates the SR motion information 110 through the motion estimation between two HR images. The SR motion information 110 thus generated is inputted into the super-resolution motion compensator 313, and the super-resolution motion compensator 313 modifies the SR motion information 110 into high-accuracy modified SR motion information 111, using the original images. In the present example, the super-resolution motion compensator 313 receives input of a total of (L+1) original HR images 101 consisting of original HR images corresponding to the plurality of (L) reference reconstructed LR images, and a reconstructed HR image as a target for the resolution enhancement process, and the SR motion information 110, and detects modified SRMVs. Then the super-resolution motion compensator 313 generates modified SR motion information 111 for a region where the difference between the SRMV and the modified SRMV (or a difference between prediction errors in application of the SRMV and the modified SRMV) is large or for a region requiring a large operation time for the detection of the optimal SRMV, and outputs it to the resolution enhancement processor 310 and to the subsidiary data encoding-rate controller 311. As described in Modification Example (7), the method of generating the modified SR motion information in the super-resolution motion compensator 313 is not limited to one technique. The modified SR motion information is considered, for example, to consist of the block location information on the reference HR image (image in the HR size enlarged from the reference reconstructed LR image), reference frame number, block size, and modified SRMV. The block size is used for the purpose of reducing the number of coding bits of the subsidiary data by joint coding of several pixels. The number of modified SRMVs belonging to the modified SR motion information is not less than 1 nor more than N×N where the block size is N×N pixels. The number of modified SRMVs can be clearly specified to the decoding side by adding the information such as the motion vector density information 708 to the modified motion vector information.

The resolution enhancement processor 310 updates the SR motion information 110 in the motion searcher 411, using the modified SR motion information 111. The coding noise estimator 412 generates virtual reconstructed HR image 106, using the reconstructed LR image 102 on which the resolution enhancement is performed, the L reconstructed LR images 102, and the updated SR motion information 110. In the present example, as described above, the resolution enhancement process and the super-resolution motion compensation process are iterated to optimize the reconstructed HR image 106, SR motion information 110, and modified SR motion information 111. A conceivable optimization method is, for example, a method of determining the number of coding bits of subsidiary data and adjusting the modified SR motion information 111 so as to minimize the error between reconstructed HR image 106 and original HR image in the determined number of coding bits, but there are no restrictions on the optimization method in the present invention. For permitting the encoding side and the decoding side to generate the same reconstructed HR image 106, it is necessary to regenerate the reconstructed HR image according to an application method of the modified SR motion information, after the optimization of the modified SR motion information 111. The subsidiary data encoding-rate controller 311 encodes the optimized modified SR motion information into subsidiary data 113 and transmits the subsidiary data 113 to the decoding apparatus.

In the present example, the present invention is also effective even in the case where the image with a higher resolution is generated from a plurality of images, instead of the decoded images from encoded video data, as described in Modification Example (1). As described in Modification Example (4), the SRMV does not have to be calculated for all the pixels and, for a pixel with no corresponding point found, the reconstructed HR image 106 is generated without use of the motion data of that pixel. In the present example, therefore, it is also effective to transmit the information indicating no use of motion data of a target pixel, as modified SR motion information, as described in Modification Example (4).

Figure 15:
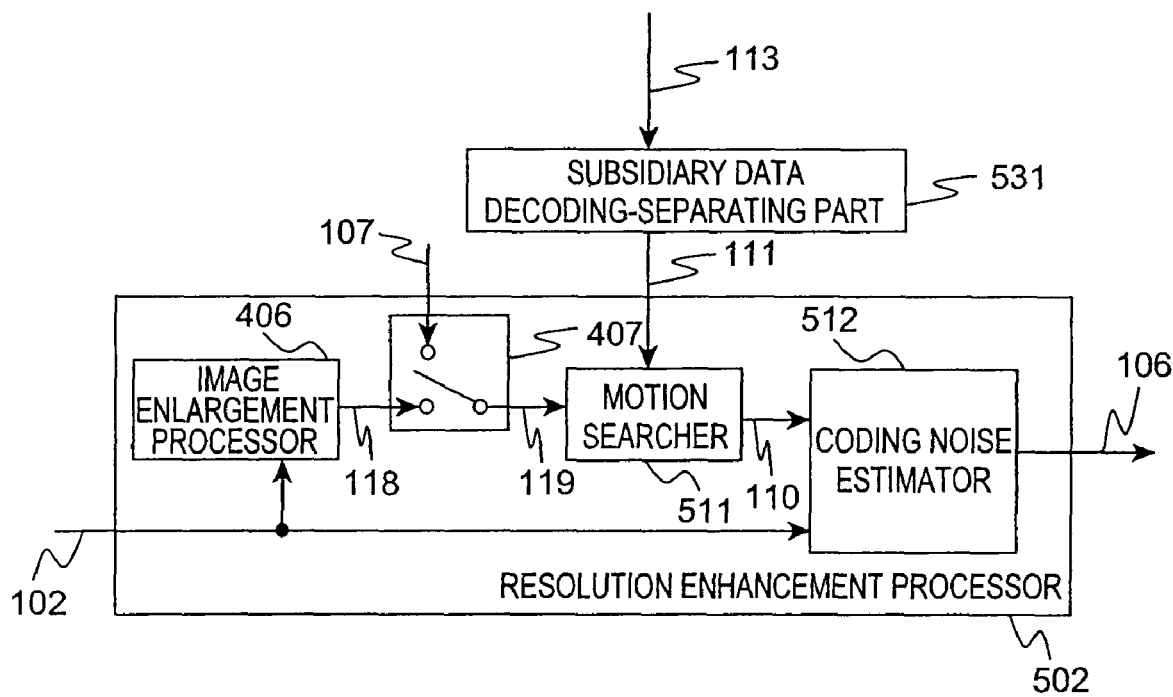
FIG. 15 is an illustration to illustrate another example of the resolution enhancement process using a decoding process according to the present invention.

FIG. 15 shows an internal configuration of resolution enhancement processor 502, and subsidiary data decoding-separating part 531 in the present example. In the present example, the resolution enhancement processor 502 in FIG. 15 corresponds to the super-resolution image synthesizer 510 in FIG. 7.

The resolution enhancement processor 502 generates the reconstructed HR image 106 and SR motion information 110, using the reconstructed LR images 102, decoded modified SR motion information 111, and reference HR images 107 (reconstructed HR images already generated). First, the subsidiary data decoding-separating part 531 separates the data of modified SR motion information 111 from the subsidiary data 113 of the target frame for resolution enhancement, and decodes it by variable-length decoding. Next, the resolution enhancement processor 502 generates the enlarged image 118 in the image enlargement processor 406. As shown in FIG. 14, the virtual HR image 119 is selected from enlarged image 118 and reference HR image 107 according to a predetermined procedure. Then it generates the SR motion information 110 and reconstructed HR image 106, using a plurality of virtual HR images 119 and modified SR motion information 111. Specifically, the resolution enhancement processor 502 performs a process of iterating the generation of SRMV by the motion searcher 511 and the generation of reconstructed HR image 106 by the coding noise estimator 512 to optimize them.

The present example is configured to generate the SR motion information 110 between HR images, but it is also possible to adopt a configuration wherein the processing of the image enlargement processor is omitted in the case where the reference HR image does not exist (in the first iterating process) and wherein the motion estimation is carried out between reconstructed LR images and the result is enlarged to the SRMV by interpolation of motion vector values or by the zero-order hold method. In this example, therefore, the meaning and number of modified SRMVs being the component of the modified SR motion information can vary according to the times of iterating processes. Another conceivable case is one wherein motion vectors detected by the motion search between normal reconstructed images, instead of the motion search between original images, are transmitted as the modified SR motion information, in order to reduce the computational complexity on the decoding side.

There are several conceivable techniques for utilization of the modified SR motion information, and it is not limited to one technique in the present invention. The conceivable methods of utilizing the modified SRMV include a method of applying the modified SRMV without performing the motion search of SRMV, a method of applying the modified SRMV and thereafter readjusting it by the motion search, and a method of determining the final SRMV using the SRMV detected by execution of the motion search, and the modified SRMV. Conceivable cases for readjustment include a case wherein the adjustment is carried out so as to achieve a higher quality of the reconstructed HR image in consideration of the difference of the reconstructed LR images actually used for generation of the reconstructed HR image, and cases for improvement in the accuracy of MV, e.g., a case where the modified SRMVs transmitted in block units are improved into SRMVs in pixel units, and a case where the pixel accuracy of modified SRMV is improved. Conceivable methods of determining the final motion vector using two motion vectors include a case where the modified SRMV is a difference vector between an SRMV detected by execution of the motion search, and the final SRMV, a case where an average of a modified SRMV and an SRMV detected by execution of the motion search is the final SRMV, and so on. Namely, a potential mode is such that the modified SR motion information contains the modified SRMV and the modified SRMV is used as a motion vector; another potential mode is such that the modified SR motion information contains the modified SRMV, an intermediate motion vector is detected using a plurality of reconstructed images, and a motion vector is generated by addition of the intermediate motion vector and the modified SRMV. Still another potential mode is such that the modified SR motion information contains the modified SRMV, the modified SRMV is defined as an initial motion vector of the motion vector, and the initial motion vector is updated using a plurality of reconstructed images to generate a motion vector.

There are several conceivable techniques for performing the iterating process in use of the modified SR motion information. The techniques are roughly classified into a method of applying the same modified SRMV to all cycles of the iterating process and a method of applying the modified SRMV to only a specific cycle in the iterating process. The latter also includes a conceivable case where different modified SRMVs are transmitted for iterating cycles in the same region or block, for reasons such as a reduction in computational complexity.

This modification example described the encoding apparatus and decoding apparatus, but the same modification can be applied to the processing flows shown in FIGS. 9 to 11. In this case, the generation of virtual HR image 119, described above in the super resolution process 805 in FIG. 10, is carried out by the method described above, though not shown. The image encoding process or image decoding process in this modification example can be carried out by a computer system according to a program, as described in FIG. 12.

(9) Modification Example Concerning Utilization of Reference HR Image

FIGS. 5 and 7 show the example wherein the quality sharpening process is carried out using the HR motion information 112, but the quality sharpening process can also be implemented by a method without use of the HR motion information in the high-resolution motion compensator 314. In this case, the motion compensator 421 (521) detects the HRMV, using a plurality of reference HR images 107, reconstructed HR image 123 outputted from the coding noise estimator 412 (512), and pixel data previously modified by the quality improving process on a virtual reconstructed HR image as a target image for resolution enhancement. On this occasion, the utilization of the modified pixel data on the reconstructed HR image is considered to improve the searching accuracy. For example, where the modification process is carried out in the raster scan order in block units, the search can be performed using updated pixels at the upper and at the left of the current block on the updated reconstructed HR image. The quality improver 422 (522) improves the quality of reconstructed HR image 106 by use of the detected HRMV. As described in Modification Example (2), the method of improving the quality of the reconstructed HR image by use of the reference HR image in the image sharpening process is not limited to one technique. Conceivable methods include a method of synthesizing pixels of two images (HR image generated using reference HR image 107 and HRMVs, and virtual reconstructed HR image) by partial weighted synthesis, a replacement method of replacing pixels on the virtual reconstructed HR image with pixels on the HR image generated using the reference HR image and HRMVs, a method of optimizing the reconstructed HR image by use of the SRMVs between a plurality of reference HR images 107 and the virtual HR image, and so on. Furthermore, a method of modifying the HRMV detected by the motion compensator 421 (521), with use of the HR motion information 112 is also effective as a method of enhancing the performance of the quality sharpening process. In this case, the motion vector in HR motion information 112 (modified HRMV) is a differential motion vector between the HRMV detected in the motion compensator 421 and the final HRMV. A means for preparing the method using the HRMV described in FIGS. 5 and 7, the method using the modified HRMV described herein, and the method of detecting the HRMV in the motion compensator 421 (521), as methods of the quality sharpening process, and defining selection information thereof as a component of the HR motion information is also considered to be effective as a method of enhancing the processing efficiency of the quality sharpening process.

The above described the configuration wherein the optimization of reconstructed HR image 123 (106 in FIGS. 14 and 15) was carried out using a plurality of reconstructed LR images 102 and the SR motion information 110 in the coding noise estimator in FIGS. 5, 7, 14, and 15, but it is also effective to use the reference HR image 107, instead of the reconstructed LR image 102, for a frame for which a previously generated reconstructed HR image is available. In this case, the reconstructed HR image 107 is inputted into the coding noise estimator 412 in FIGS. 5 and 14 and to the coding noise estimator 512 in FIGS. 7 and 15. In this modification example, an assumed model can be one without the sampling models 202 in FIG. 1. The SRMVs between virtual HR images described in the description of FIGS. 14 and 15 can be utilized as the motion models 201.

(10) Modification Concerning Method of Using Components of Subsidiary Data

It is not requested to transmit all the data of components, and information uniquely determined on the encoding side and on the decoding side can be excluded from the components to be transmitted. For example, where some of components can be specified using information such as features of images simultaneously having at the encoding side and the decoding side, the transmission of them can be omitted. Unnecessary data in the combination of data of components can also be excluded from the components to be transmitted. For example, when a method of indicating whether a subsidiary motion vector is transmitted is applied to each block, the block location information does not need to be transmitted, and transmission of the subsidiary motion vector is also unnecessary according to circumstances. In the case where it is indicated that the SRMV in an arbitrary region or block is not effective to generation of the reconstructed HR image, as described in Modification Example (4), transmission of the modified SRMV is not necessary, either. Furthermore, instead of the method of controlling transmission of data of some of the components on the basis of an implicit rule on the encoding side and on the decoding side, it is also possible to adopt a method of explicitly indicating the components to be transmitted, by making the components include mode information indicating which data of components are to be transmitted.

A method of hierarchically transmitting the data of components in segments such as sequence units, frame units, slice units (each slice consisting of a plurality of blocks), or block units is also an effective means for reducing the number of codes, as a method of transmitting the subsidiary data. Namely, the number of coding bits can be reduced by hierarchically transmitting the data of components according to their roles. In this case, information transmitted in an upper layer does not have to be transmitted in a lower layer. For example, where the block size is transmitted as subsidiary information in frame units, it does not have to be transmitted in the subsidiary motion information in block units. In this case, it is also effective to adopt a method of explicitly indicating to the decoding side the mode information according to a combination of transmission patterns or transmission groups, while classifying the data of components transmitted in block units, into several transmission patterns (different combinations of component data) or transmission groups (classes of component data). A further potential method is to transmit the mode information as information in slice units or in frame units, which can be said to be effective as a method of performing a control reflecting a change of tendency of image in region or frame units.

Another subsidiary data transmission method is a method of classifying the data of components into several groups according to their localities and transmitting information indicating whether values of components in each group are to be changed or not. It is believed that this method can reduce the number of codes of subsidiary data. A rule is preliminarily defined so as to apply just previously transmitted values or default values to data in a group without change. Data of components for a group with change is transmitted as subsidiary data.

There are no restrictions on the components of LR motion information, modified SR motion information, and HR motion information, as described in Modification Example (4). For example, a conceivable method is one of transmitting types of the LR motion information, modified SR motion information, and HR motion information (data types 702) in block units. The mode information explicitly indicating the combination of data of components in the subsidiary motion information, and the transmission method is also included in the modification example of components. This mode information transmission method is not limited to the modified SR motion information, but can also be applied to the LR motion information and the HR motion information.

Furthermore, it is also effective to adopt a method of explicitly indicating the utilization method of the modified SR motion information described in Modification Example (8), as data of components, and it permits the processing on the decoding side to be efficiently carried out according to the information obtained on the encoding side by use of the original image. This utilization method of subsidiary motion information is not limited to the modified SR motion information, either, but it is also applicable similarly to the utilization methods of the LR motion information and HR motion information. The information of the utilization method includes an application method of subsidiary motion information (to use the subsidiary motion information without execution of the motion search in the decoder, or to adjust the subsidiary motion information in the decoder), and an adjustment method in the adjustment case (to generate the motion vector in finer units or to adjust the pixel accuracy of the motion vector). It also includes information indicating the correspondence to the iterating process described in Modification Example (8) (to apply the subsidiary motion information to all the iterating processes, or to apply it to only a specific iterating cycle in the process), or information indicating a specific cycle in the iterating process. A conceivable method indicating utilization of subsidiary motion information is a method of transmitting information indicating a purpose of use of subsidiary motion information (a reduction in computational complexity or an improvement in the quality of reconstructed HR image) to the receiving side and thereby changing the processing on the receiving side.

On the other hand, concerning the motion vector density information 707, there are other conceivable examples such as a method of indicating the number of motion vectors and a method of uniquely determining it according to the block size information, without transmitting the motion vector density information 707 to the receiving side.

Furthermore, concerning the LR motion information, there are a method of newly adding the LRMV to a block without a DECMV, and a method of changing values of a DECMV in a block therewith into a different LRMV. Therefore, it is also possible to adopt a method of explicitly transmitting the LRMV utilization information, instead of generating it from the DECMV. In this case, the motion information with higher accuracy can be provided for the resolution enhancement process if the block size is included as a component.

First of all, a modification example of the HR motion information is a method of motion estimation. By adopting adaptive selection between a method of carrying out the motion estimation between reconstructed HR images (Modification Example (9)) and a method of carrying out the motion estimation by use of the original HR image and transmitting the selected motion estimation method as data of a component in the HR motion information, it becomes feasible to achieve a reduction in the number of codes of the HR motion information and optimization of the quality of the reconstructed HR image. In addition, concerning the quality improving process (process of improving the quality of the reconstructed HR image by use of the reference HR image), there are also several candidates such as the weighted synthesis method and the replacement method with the reference HR image, and thus an improvement in the quality of the reconstructed HR image can be expected by explicitly transmitting the information indicating the synthesis method.

There are also conceivable modifications of the SR motion information. For example, the SRMV is data indicating the time-space correspondences between LR and HR images in FIG. 5, whereas it represents data indicating the time-space correspondences between HR images or between LR images in FIG. 14, as being different in expression. When this difference is explicitly transmitted in frame units or in block units, it becomes feasible to achieve an improvement in the quality according to local features and, in turn, to achieve a further improvement in the image quality. By adding this information to the components in the modified SR information and transmitting it instead of the modified SRMV, it becomes feasible to enhance the detection accuracy of the SRMV, without transmission of the modified SRMV. Candidates for the virtual HR image used in the detection of the SRMV include the enlarged image and the reference HR image, as shown in FIGS. 14 and 15, and either of them can be selected. An improvement in the detection accuracy of the SRMV can also be expected by adding the reference image information for explicitly selecting the type of the virtual HR image, to the components of the modified SR information. This configuration does not require the transmission of the modified SRMV, either.

A conceivable modification example of the modified SR motion information, except for the above, is resolution information of the modified SRMV (whether it is the MV of LR image level or the MV of HR image level). By transmitting this data, it becomes feasible to explicitly indicate the resolution suitable for a local feature of a region. Another conceivable configuration is a case where an effective number of iteration times is explicitly indicated to inform the receiving side that a search for SRMV does not have to be performed again in a region of interest, after the specified number of iteration times. This information suppresses waste motion search transactions.

(11) Application of Subsidiary Data

The transmission of subsidiary motion information, and the subsidiary motion information have been described heretofore with focus around the subsidiary motion vectors such as the modified SRMV. In this case, where the useful motion vectors are transmitted to the receiving side, the receiving side becomes able to generate the reconstructed HR image with higher quality. On the other hand, with focus on the motion vectors such as the SRMV generated in the resolution enhancement processor, the conditions necessary for generation of the motion vector, e.g., the method and condition for execution of the motion search are carried out according to the rule preliminarily determined on the receiving side. The following will describe the motion search as an example. There are a number of methods of the motion search suitable for various features of images, and, in the case where the motion vectors obtained by the search are transmitted to the receiving side, a preferred method and condition for the motion search can be determined on the transmitting side by use of original data. However, in the case where the motion search is carried out using already-decoded pixel data as in the resolution enhancement process, it is necessary to determine its method and condition on the receiving side having no original data. Therefore, a method presented herein is a method wherein the encoding side having the original data carries out the selection of the preferred method and condition for the motion search and transmits the information as subsidiary motion information to the receiving side. This method also has the effect of improving the accuracy of the motion vector by use of the original data and the effect of reducing the time necessary for the detection of the motion vector, and is thus considered to be an effective means for improvement in the quality of the reconstructed HR image and for increase of efficiency. In order to use the reconstructed HR image in subsequent processes, the encoding side and the receiving side need to generate the same reconstructed HR image and therefore the encoding side and the receiving side have to share the method and condition for the motion search. There is a method for sharing wherein the encoding side and the receiving side preliminarily determine the method and condition for the motion search, but, by transmitting them as subsidiary motion information as described herein, it becomes feasible to achieve a reduction in computational complexity and an improvement in the quality of the HR image according to localities of the image.

There are no restrictions in the present specification on the types and number of motion search methods and conditions (hereinafter referred to as motion search condition information). Examples of the types include a search range, a motion search technique, etc., and the details will be described later. A method of generating the motion search condition information will be described with reference to FIG. 13. In this case, though not shown, the reconstructed HR image 106 is assumed to be also outputted to the super-resolution motion compensator 313. The super-resolution motion compensator 313 puts candidates for the motion search condition information in the modified SR motion information 111 and inputs it into the resolution enhancement processor 310. The resolution enhancement processor 310 generates the SR motion information 110 and reconstructed HR image 106 based on the motion search condition information included in the modified SR motion information 111. The super-resolution motion compensator 313 evaluates the motion search condition information by use of the reconstructed HR image 106 and original HR image (e.g., an evaluated value is the sum of absolute errors). This process is carried out for a plurality of candidates for the motion search condition information to select condition information providing the best evaluation result. How to determine the generation method of motion search condition information does not have to be limited to this method. For example, another effective method is a method of, instead of the comparison between the reconstructed HR image and the original HR image, comparing the SRMV generated in the resolution enhancement processor, with the modified SRMV in the modified SR motion information 111 generated in the super-resolution motion compensator 313 and selecting the motion search condition information to minimize the difference between them. In this case, the reconstructed HR image 106 does not have to be outputted to the super-resolution motion compensator 313.

Concerning how to transmit the motion search condition information, there are several conceivable methods as in the case of the motion vector information. A method of hierarchically transmitting the information in frame units or in block units is also an effective means for reducing the number of coding bits. For data to be transmitted, conceivable methods include a method of transmitting numerical values directly, and a method of preparing several candidates and transmitting selection information. The method of transmitting numerical values has high degrees of freedom on one hand, but can increase the number of coding bits on the other hand. For this reason, it is considered to be an applicable method in the cases where the information is transmitted in some units such as sequence units or frame units. The method of selecting one from candidates is basically applied to the cases of transmission in block units and in pixel units.

Now we will describe an application method to the resolution enhancement process using the subsidiary motion vector and the motion search condition information. In the case where the subsidiary motion information can include the motion search condition information as in the present modification example, different processes have to be carried out according to the available subsidiary motion vector and motion search condition information, as local processes in an image area.

Where the subsidiary motion information contains the subsidiary motion vector but does not include the motion search condition information, the resolution enhancement processor uses the reconstructed subsidiary motion vector to detect the SRMV (HRMV) of the region (block), and generates the reconstructed HR image. The details of the use method have already been described in the section of the use method of the modified SRMV in Modification Example (8), and are thus omitted herein. A general method of reconstructing the subsidiary motion vector is a method of adding the predicted motion vector obtained by a predetermined method, to the differential motion vector obtained by decoding of subsidiary data, as described in the description of FIG. 8, but no restrictions are imposed in the present invention as described in Modification Example (3). For example, where the decoded motion vector is the differential motion vector between the SRMV (HRMV) detected by the predetermined method and the final SRMV (HRMV), the prediction process can be omitted because the number of coding bits is small even with direct encoding of the differential motion vector. Selection methods where a plurality of use methods of the subsidiary motion vector are prepared include a method of explicitly indicating an application method by transmitting the selection information as subsidiary motion information, a method of uniquely determining it based on a condition (e.g., a value of data of a component in the subsidiary motion information), and so on.

In the case where the subsidiary motion information includes the motion search condition information but does not contain the subsidiary motion vector, the resolution enhancement processor detects the SRMV (HRMV) of that region (block) according to the decoded motion search method and condition, and uses it in the generation of the reconstructed HR image. On this occasion, if the decoded motion search condition information does not include some of necessary information, a predetermined value is applied as its information. For example, where the search range can be a smaller search range than the predetermined value, the information of the search range will be transmitted, which provides the effect of reducing the computational complexity necessary for the motion search.

Other conceivable examples in the case where the subsidiary motion information includes the motion search condition information but does not include the subsidiary motion vector include a method of detecting the SRMV (HRMV) based on predetermined condition information for motion search and thereafter modifying the detected SRMV (HRMV) based on the decoded condition information, a method of modifying the SRMV (HRMV) detected by a previous iterating process, based on the decoded motion search condition information, and so on. For example, a small search range for modification of the SRMV (HRMV) is transmitted, which provides the effect of making a balance between computational complexity and search performance. Selection methods in the case where there are a plurality of candidates for the use method of the motion search condition information include a method of explicitly indicating an application method by transmitting selection information as the subsidiary motion information, a method of uniquely determining it based on a condition (e.g., a value of data of a component in the subsidiary motion information), and so on.

In the case where the subsidiary motion information includes both of the subsidiary motion vector and the motion search condition information, a potential method is a method of determining the final SRMV (HRMV) from the SRMV (HRMV) detected based on the motion search condition information and the restored subsidiary motion vector. An example of this case is a case wherein the subsidiary motion vector is a differential vector between the SRMV (HRMV) detected based on the motion search condition information, and the final SRMV (HRMV). For example, the motion search condition information is switched in high layer units such as frame units or slice units, while only a difference from an estimate is encoded for a motion vector requiring the accuracy of block unit or higher, which can reduce the number of coding bits. This is effective in a region where variation of motion vectors is too large to maintain satisfactory performance of the motion vector estimation using motion vectors in adjacent regions. Another method is a procedure of detecting a rough motion vector based on the motion search condition information by small computational complexity and adding it to the differential motion vector, which also has the effect of reducing the computational complexity of the motion search.

Another example in the case where the subsidiary motion information includes both of the subsidiary motion vector and the motion search condition information, is a method of modifying the reconstructed subsidiary motion vector based on the motion search condition information and defining the modified subsidiary motion vector as a final motion vector. This method enables the following operation: the subsidiary motion vector is transmitted for a wide region (block) and the transmitted subsidiary motion vector is modified into a motion vector of a narrower region (block or pixel) based on the motion search condition information. For this reason, the number of coding bits can be reduced. Still another method is a method of modifying the SRMV (HRMV) by the subsidiary motion vector and readjusting the modified SRMV (HRMV) based on the motion search condition information.

A conceivable method for indicating the existence of the subsidiary motion vector and the motion search condition information is, for example, a method of explicitly indicating it as mode information as described in the first half of Modification Example (10). If the hierarchical transmission is applied for each of the parameters such as the method and condition contained in the motion search condition information, the number of codes can be reduced.

There is a case where the subsidiary motion information includes neither the subsidiary motion vector nor the motion search condition information, and an example will be described as a procedure of the resolution enhancement process in that case. A situation is a case where the subsidiary motion information includes information indicating that the motion vector in that region (block) is not valid for generation of the reconstructed HR image. In this case, the resolution enhancement processor does not carry out the motion search for the SRMV (HRMV) of that region (block), and generates the reconstructed HR image without use of the SRMV (HRMV) of that region. Let us explain it using the aforementioned Non-patent Document 1 (the model in FIG. 1) as an example. Potential methods include a method of replacing the disabled motion vector with a motion vector generated by interpolation using motion vectors of adjacent pixels, for the matrix C (d_lk), and a method of setting the filter coefficient corresponding to the disabled motion vector to 0 in the matrix H and then adjusting the filter coefficient corresponding to a pixel associated with the disabled motion vector. Another case without the subsidiary motion vector nor the motion search condition information is a situation where the subsidiary motion information includes a number of times of iterations where the update process of the SRMV (HRMV) of that region (block) becomes valid. In this case, the resolution enhancement processor does not again perform a search for the SRMV (HRMV) of that region in iterating processes after the specified number of times of iterations, but carries out the generation of the reconstructed HR image.

The following will describe examples of conditions necessary for the motion search.

a) Motion Detection Method

FIG. 2 was described using the block matching method as the motion detection method, but available motion search methods include a plurality of techniques such as the gradient method (e.g., Japanese Patent No. 3271369 (Reference Document 6)), the pixel matching method (e.g., Japanese Patent No. 2934151 (Reference Document 7)), and the template matching method (e.g., Japanese Patent Application Laid-Open No. 1-228384 (Reference Document 8)). The effectiveness of these techniques differs depending upon features of regions in an image. Therefore, if the decoding side is notified of an appropriate technique as a condition for the motion search, we can expect an improvement in the performance of motion detection on the decoding side.

b) Search Range and Search Center

Figure 16:
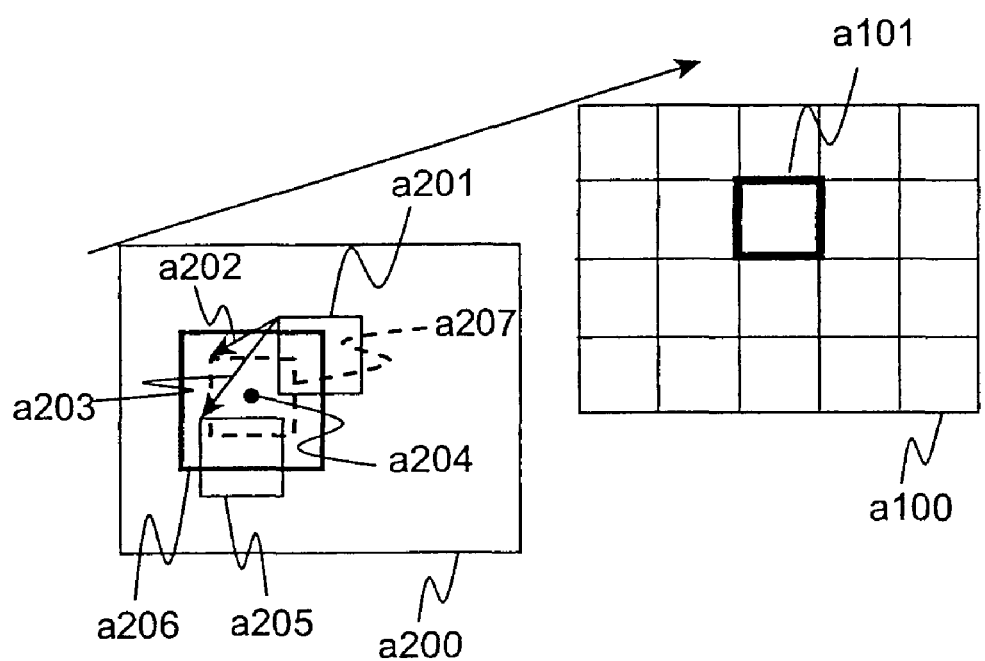
FIG. 16 is an illustration to illustrate a block matching method.

In a search for motion, enormous computational complexity will be needed if the search is carried out over the entire image. Therefore, a search range is normally defined and the search is conducted in that range. The preferred search range differs according to features of image regions, and thus the condition thereof will cause large effect on the search result. Therefore, if an appropriate search range is explicitly transmitted to the decoding side, the decoding side can perform a wasteless motion search. By appropriately setting the center of the search range, it becomes feasible to narrow the search range. Therefore, by explicitly transmitting a method of determining the search center to the decoding side, it becomes feasible to increase the processing efficiency associated with the motion search on the decoding side. Potential methods of determining the motion search center include, for example, a method of making use of an amount of motion estimated from the motion search results of adjacent regions, a method of defining the motion amount of 0 as the search center, and so on. FIG. 16 shows an example of block matching. In the drawing a100 denotes a current frame, a101 a search target block, a200 a reference frame, and a201, which is spatially identical to the block a101, a block on the reference frame. Reference symbol a202 represents a motion vector of an adjacent block to a101 and is used for setting a search center a204 for the block a101. Motion vector a203 and predicted block a205 are detected by setting search range a206 around the search center a204 and performing a search in the search range. As a motion vector for determining the search center, a motion vector determined using candidates of motion vectors of three blocks adjacent left, above, and right above to the block a101 and median value of respective components thereof is frequently used in the motion search in the encoder.

c) Search Block Size

Concerning units for execution of the motion search, the appropriate size also differs depending upon features of image regions. For example, in the case of the block matching, a plurality of search block sizes are prepared, and the search block size is transmitted in sequence units, frame units, slice units, or block units (larger than the search block size) to the decoding side, which can improve the accuracy of the motion search. There are also cases where the motion search is not carried out in block units but in units of arbitrary shape. In this case, information to be transmitted is shape information (triangular patch or the like), a method of division of regions, or the like.

d) Motion Search Method

In execution of the motion search, the search over the entire search range will require high computational complexity, and thus a conceivable method is to perform a thinning search in the search range. By providing a function of explicitly transmitting the method of the motion search to the decoding side, it becomes feasible to adjust the computational complexity and search performance. Available motion search methods include the full search of performing the search all over in the search range, the tree search of narrowing down the motion based on the procedure of performing the search at intervals of several pixels vertical and horizontal and further performing the search at narrower pixel intervals around a position found by the rough search, and so on. Another effective technique to reduce the computational complexity is the hierarchical search that is not a single search in the search range, but a search method of performing a search in a large block size in a large search range, defining a search center based on the result of the first search, and further performing a second search in a small block size in a smaller search range. In this hierarchical search, the search range and search block size have to be transmitted according to the number of layers.

e) Search Order

There are several methods of defining the search order in execution of the motion search: e.g., a method of performing the search in the raster scan order from upper left to lower right in the range of the motion search, and a method of performing the search in a spiral order from the center of the motion search range toward the outside. If the search order is explicitly transmitted to the decoding side, the encoding side and the decoding side can obtain the same result. There are cases where a condition for suspension of the search is provided in order to increase the speed. By also explicitly transmitting this search suspension condition (a threshold of prediction error or the like) to the decoding side, it becomes feasible to reduce the operation time necessary for the motion search in the decoder.

f) Motion Detection Accuracy

Concerning the motion detection accuracy in the motion search, the standard systems such as MPEG actually use a plurality of accuracies such as a plurality of 1-pixel accuracy, ½-pixel accuracy, ¼-pixel accuracy, and ⅛-pixel accuracy. By also transmitting this search accuracy to the decoding side, it becomes feasible to achieve optimization of the operation time and image quality. Concerning how to generate real number pixels, a method thereof is transmitted to the decoding side, whereby it becomes feasible to achieve optimization of the image quality.

g) Evaluation Function

A plurality of methods are used as the evaluation function in execution of the motion search: i.e., the block absolute sum of prediction error signal, the sum of the squared error, the evaluated value calculated from the absolute sum of prediction error signal and the number of motion vector coding bits, and so on. By adopting a configuration wherein the encoding side having original data selects one of the evaluation functions and transmits information on the selected one to the decoding side, it becomes feasible to achieve optimization of the operation time and motion search performance. There are various conditions other than the above, including the motion models (translation model, affine transformation model, and projective transformation model) and the motion search methods (forward and backward).

Figure 17:
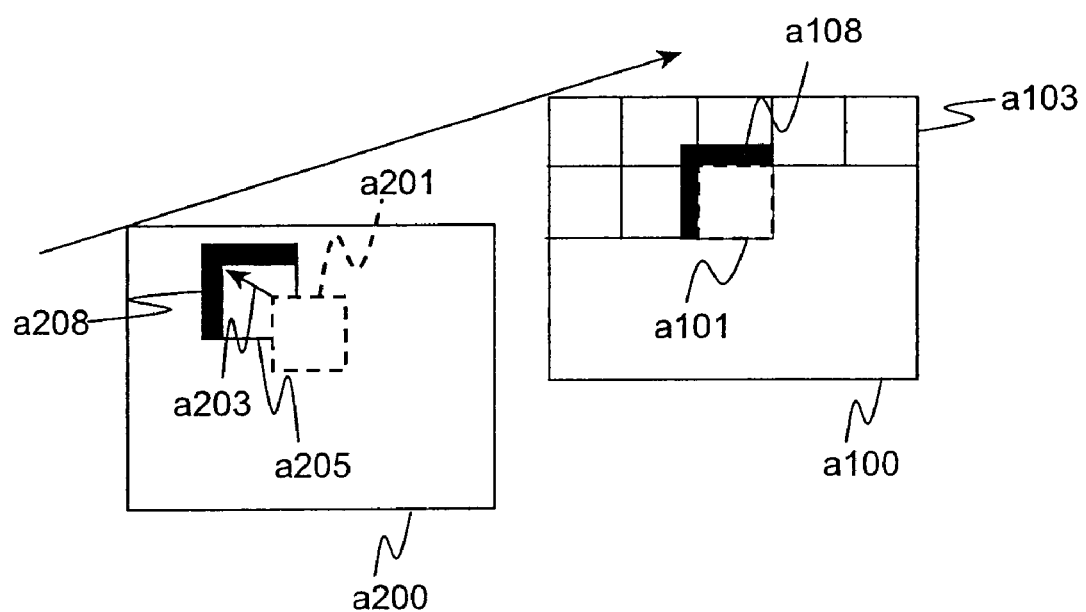
FIG. 17 is an illustration to illustrate a motion search in a decoding process.
Figure 20:
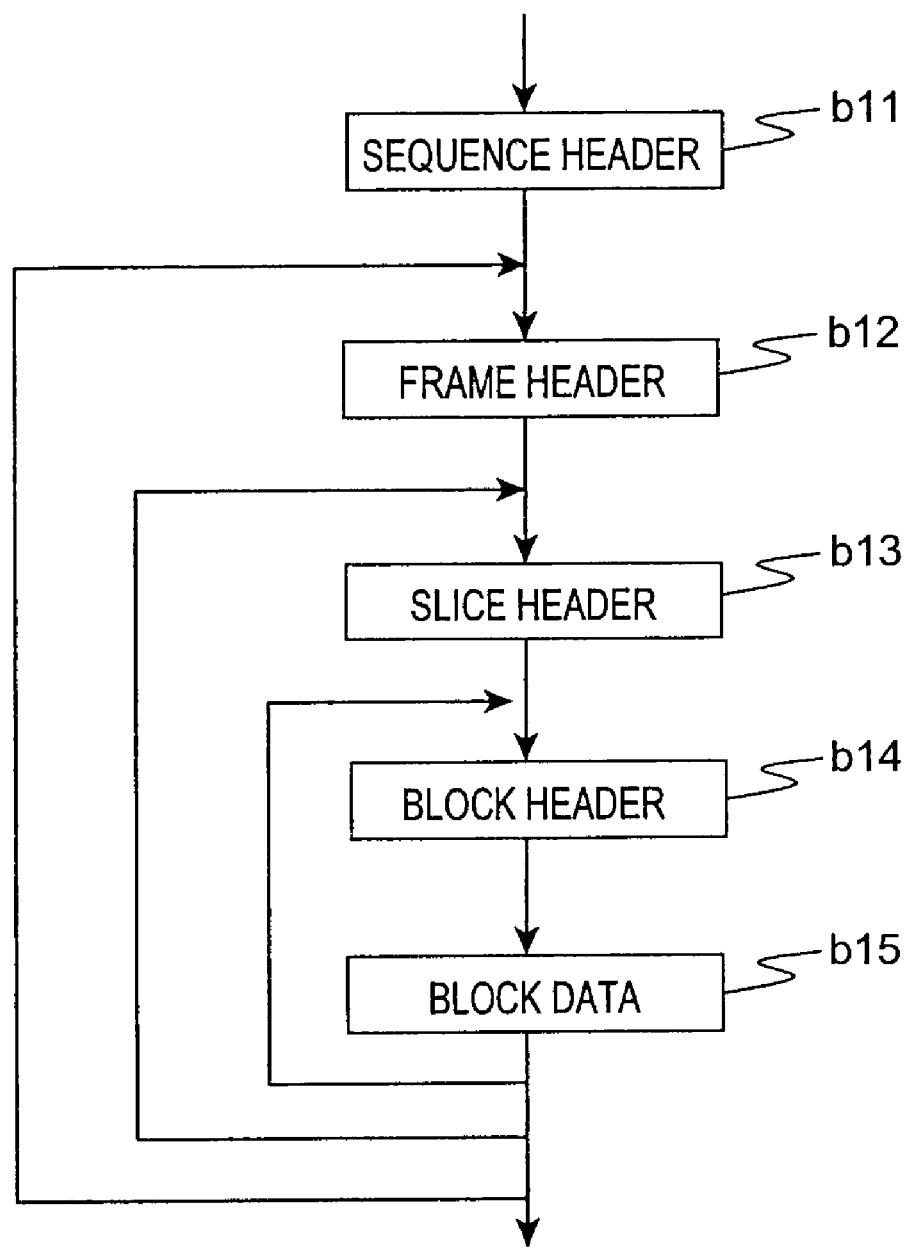
FIG. 20 is an illustration to illustrate a configuration of encoded video data.

The above described the methods of encoding and transmitting the necessary condition for the generation of the motion vector on the presumption of the resolution enhancement process, and it is noted that the procedure of transmitting the necessary condition for the generation of the motion vector to the receiving side is applicable without restrictions to the apparatus and software for generating the motion vector on the receiving side. For example, it can be applied to the video coding or the like to generate the motion vector on the decoding side. FIG. 17 illustrates a method of performing a search for a motion vector on the decoding side with use of pixel data already decoded in the video coding system. Reference symbol a200 indicates a previous frame already decoded, and a100 a current frame as a target to be encoded. The frame a100 is encoded in the raster scan order from upper left to lower right in block units, and the drawing shows that blocks in a region a103 (seven blocks) have already been encoded and decoded. In performing a search for a motion vector of block a101, a template a108 is constructed from decoded pixel data in the decoded region, and a region a208 to minimize the error sum in the template is detected. At this time, a203 is detected as a motion vector and block a205 is defined as a predicted block for the block a101. The encoding side encodes an error block between encoded block a101 and predicted block a205, but does not encode the motion vector. The decoding side performs the motion search under the same condition as the encoding side, to detect the motion vector. Then the decoding side adds the decoded error block to a predicted block generated according to the motion vector detected on the decoding side, to obtain reconstructed values of the encoded block. In the video coding including the process of generating the information associated with the motion vector on the decoding side as described above, therefore, it becomes feasible to improve the performance of the motion search on the encoding side, by determining the condition for execution of the motion search on the encoding side having the original data and by transmitting the condition to the decoding side. The hierarchical transmission method is effective as an encoding method of the necessary condition for the generation of the motion vector. FIG. 20 shows a general data structure of video coding, and general video data is composed of sequence header b11 indicating an encoding condition of an entire sequence, frame header b12 indicating an encoding condition of each frame unit, slice header b13 indicating an encoding condition of each slice unit, block header b14 indicating an encoding condition of each block unit for the motion vector, the prediction method, etc., and block data b15 including encoded data of prediction error signal. The efficiency of coding can be increased by performing the coding while sorting the various conditions necessary for generation of the motion vector into the four types of header information according to their locality.

Figure 18:
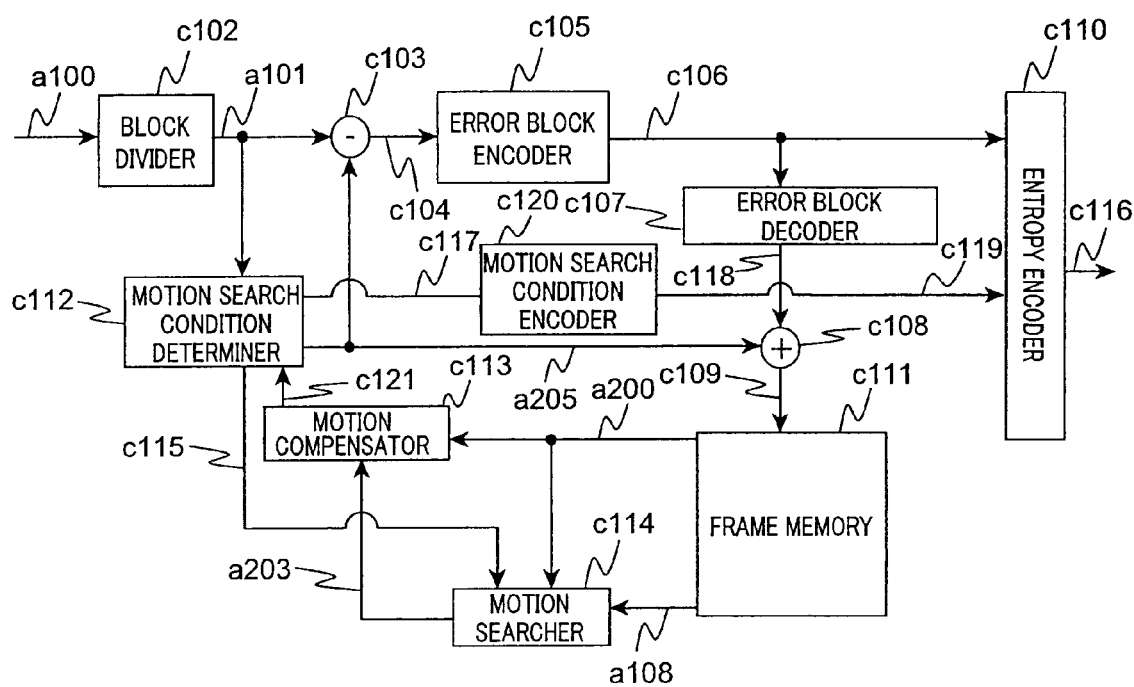
FIG. 18 is an illustration to illustrate a configuration of a video encoding process using an encoding process according to the present invention.
Figure 19:
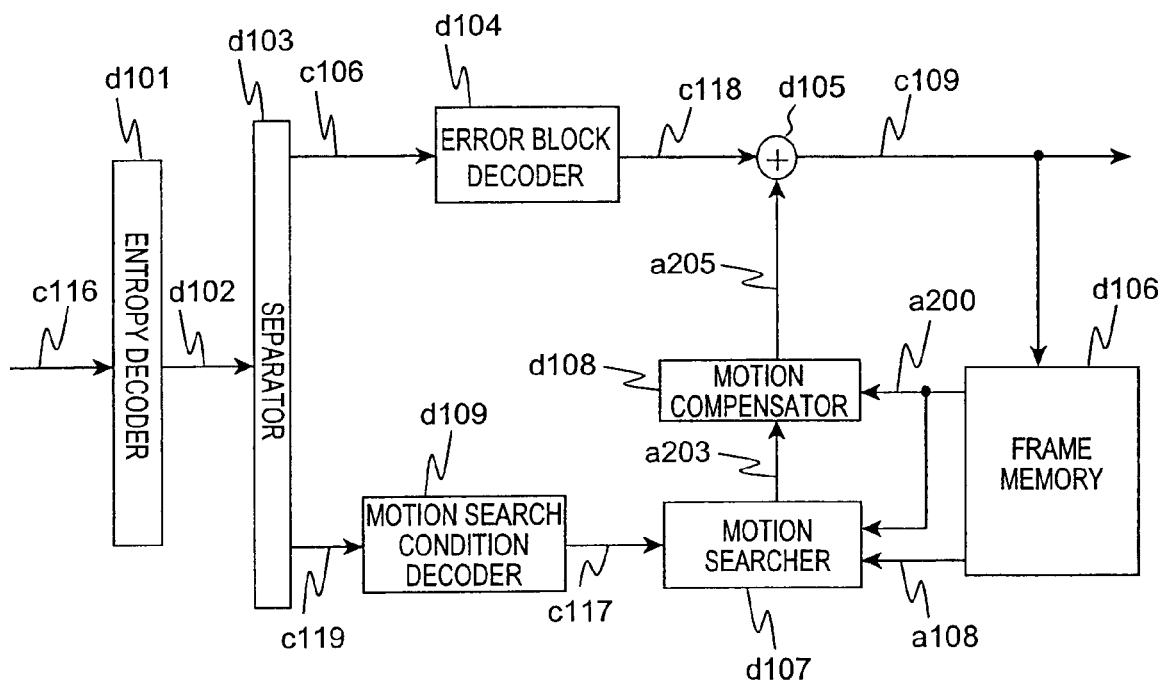
FIG. 19 is an illustration to illustrate a configuration of a video decoding process using a decoding process according to the present invention.

FIGS. 18 and 19 show examples of the coding apparatus and decoding apparatus for video coding to generate the motion vector on the decoding side. FIG. 18 shows a configuration of the encoding apparatus. A current frame a100 is divided into encoding blocks a101 by block divider c102. Each encoding block a101 is inputted into motion search condition determiner c112 and to subtracter c103. The motion search condition determiner c112 outputs candidates c115 for the necessary condition for generation of the motion vector, to motion searcher c114. Among the conditions necessary for generation of the motion vector, the conditions selected in sequence units and in frame units are selected in advance by the motion search condition determiner, using the original image. A selection method is, for example, to carry out the motion search process using the original image for a plurality of candidates for the condition and thereby select an appropriate condition. The motion searcher c114 derives decoded previous frame a200 and template a108 from frame memory c111 and detects motion vector a203 based on the condition c115 necessary for generation of the motion vector. Motion compensator c113 derives predicted block c121 corresponding to the motion vector a203 from decoded previous frame a200 derived from frame memory c111, and outputs it to motion search condition determiner c112. The motion search condition determiner c112 compares the predicted block c121 corresponding to the plurality of candidates for the necessary condition for generation of the motion vector, with the input block a101 to determine predicted block a205 providing the minimum value of the sum of absolute difference of prediction error. The condition selected at that time is inputted as condition c117 necessary for generation of the motion vector into motion search condition encoder c120.

The motion search condition encoder c120 encodes the necessary condition for generation of the motion vector and outputs the encoded information to an entropy encoder. There are no restrictions on the encoding method, but it is possible to use the method of separation in the hierarchical structure or into groups as described above, the method of restricting the components to be coded, using the mode information, the method of transmitting numeral values as they are, the method of preparing several candidates for coding information and selecting one of them, the method of encoding a difference from a predicted value estimated from an adjacent block, or the like.

The predicted block 205 is inputted into subtracter c103 and to adder c108. The subtracter c103 calculates error block c104 between input block a101 and predicted block a205 and outputs it to error block encoder c105. The error block encoder c105 performs an encoding process of the error block and outputs encoded error data c106 to entropy encoder c110 and to error block decoder c107. The error block decoder c107 decodes the encoded error data to reconstruct reconstructed error block c118, and outputs it to the adder c108. The adder c108 performs addition of reconstructed error block c118 and predicted block c205 to generate reconstructed block c109, and combines it with the reconstructed image of the current frame in the frame memory. Finally, the entropy encoder c110 combines the encoded error data c106, information c119 indicating the necessary condition for generation of the motion vector, and various header information, and outputs encoded data c116.

FIG. 19 shows a configuration of the decoding apparatus. Encoded data c116 is decoded into decoded data d102 by an entropy decoder, and separator d103 separates the data into encoded error data c106 and information c119 indicating the necessary condition for generation of the motion vector. The information c119 indicating the necessary condition for generation of the motion vector is decoded into condition c117 necessary for generation of the motion vector by motion search condition decoder d109. Motion searcher d107 derives decoded previous frame a200 and template a108 from frame memory d106, and detects motion vector a203 based on the condition c117 necessary for generation of the motion vector. Motion compensator d108 derives predicted block a205 corresponding to the motion vector a203 from the decoded previous frame a200 derived from frame memory d111, and outputs it to adder d105. Error block decoder d104 decodes the encoded error data to reconstruct reconstructed error block c118, and outputs it to the adder d105. The adder d105 performs addition of the reconstructed error block c118 and predicted block c205 to generate reconstructed block c109, and combines it with the reconstructed image of the current frame in the frame memory.

In the example of video coding, there is also a conceivable case where the block has both of the motion vector and the necessary condition for generation of the motion vector. In this case, the decoder modifies the decoded motion vector based on the necessary condition for generation of the motion vector. In another example, the decoder generates a final motion vector from the motion vector generated based on the necessary condition for generation of the motion vector, and the decoded motion vector. In this case, the decoded motion vector is considered to be a differential motion vector between the motion vector generated by the decoder and the final motion vector. As described above, the method of transmitting both the necessary condition for generation of the motion vector, and the motion vector to the receiving side can be applied to the apparatus and software for generating the motion vector on the receiving side.

This modification example described the encoding apparatus and decoding apparatus, and it is noted that the same modification can also be made for the encoding and decoding process flows. The image encoding process or image decoding process of this modification example can be implemented by a computer system according to a program, as described in FIG. 12.

Figure 21:
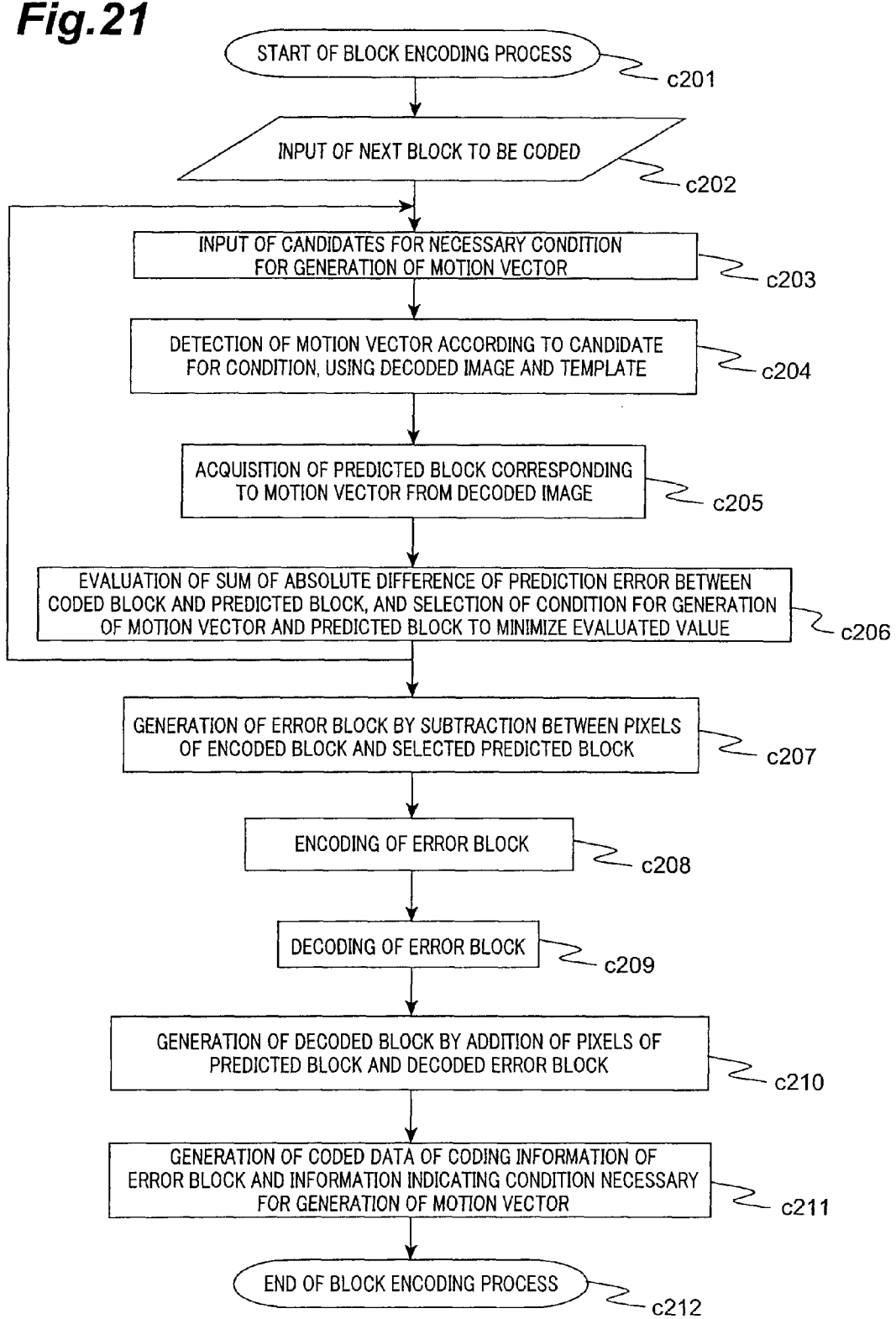
FIG. 21 is an illustration to illustrate another example of the encoding process flow according to the present invention.
Figure 22:
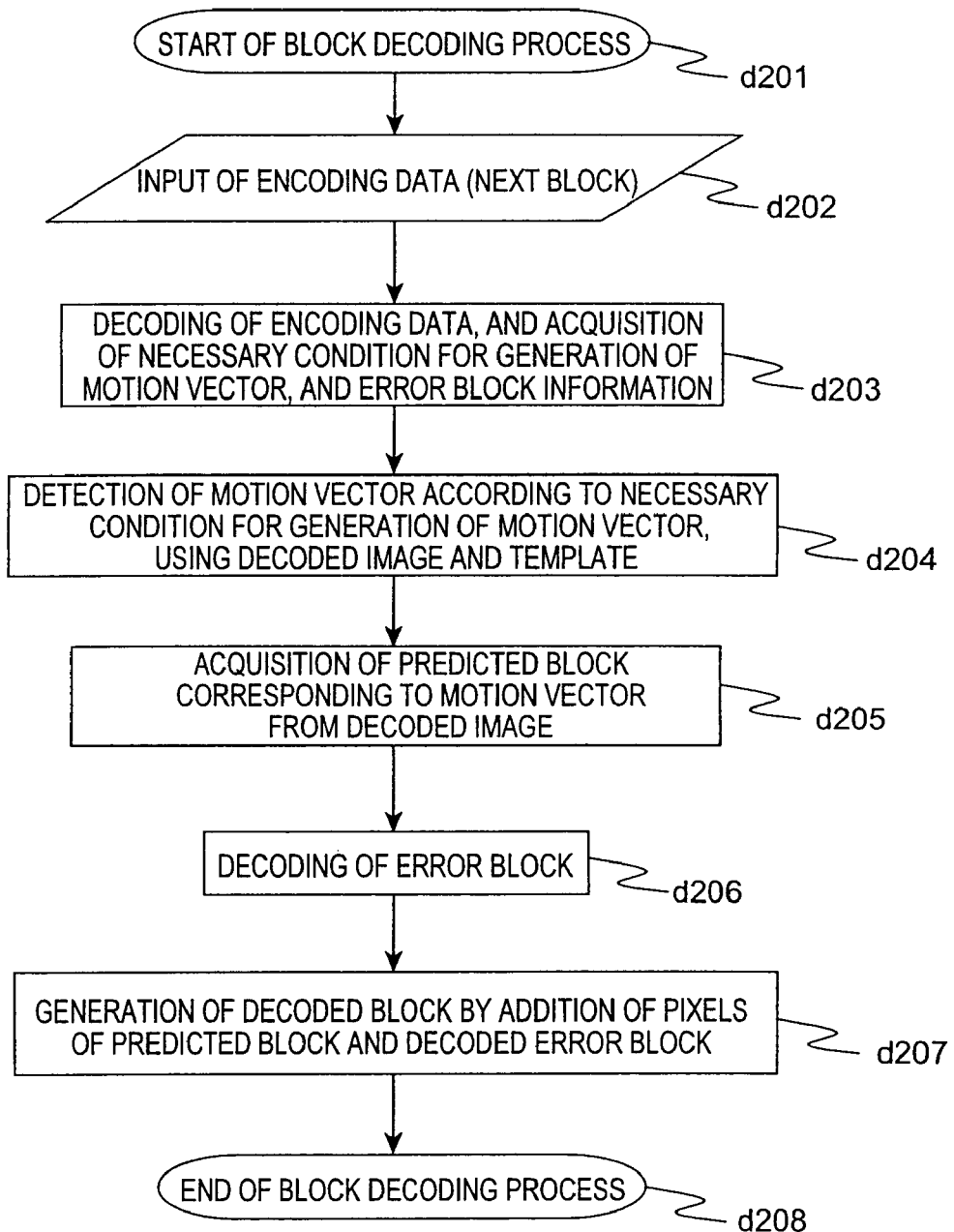
FIG. 22 is an illustration to illustrate another example of the decoding process flow according to the present invention.

FIGS. 21 and 22 show the block processing in the encoding process flow and in the decoding process flow to carry out the present modification example. Description will be omitted for the encoding and decoding of the sequence header and frame header, but the encoding process is arranged so that, among the conditions necessary for generation of the motion vector, the information to be transmitted in frame units and in sequence units is selected in those units. A method of the selection is to apply the motion search using the original image, as shown in the description of FIG. 18. In the decoding process, the encoded data of the sequence header and frame header is stored after decoded, and is used on the occasion of performing the decoding process of each block.

The block processing of the encoding process flow to carry out the present modification example will be described with reference to FIG. 21. After start process c201 of block encoding, process c202 is to input a next block to be coded. Process c203 is to select one of candidates for the necessary condition for generation of the motion vector. Process c204 is to detect the motion vector by use of the decoded image and template, as shown in FIG. 17, according to the condition. Process c205 is to acquire a predicted block corresponding to the motion vector from the decoded image. Process c206 is to evaluate the sum of absolute difference of the prediction error between the coding block and the predicted block. The processes c203-c206 are repeated for the plurality of candidates for the necessary condition for generation of the motion vector, to select the condition for generation of the motion vector, and the predicted block to minimize the prediction error absolute sum. Process c207 is to perform subtraction between pixels of the coding block and the predicted block to generate an error block. Process c208 is to encode the error block (e.g., discrete cosine transformation and quantization). Process c209 is to decode the error block (e.g., inverse quantization of quantization transformation coefficients and inverse discrete cosine transformation). Process c210 is to perform addition of the decoded error block and the predicted block to reconstruct the decoded block. Process c211 is to perform entropy coding of the coding information of the error block (quantization transformation coefficients) and the information indicating the necessary condition for generation of the motion vector, selected in process c206, to generate encoded data, and process c212 is to terminate the block encoding process.

The block processing of the decoding process flow to carry out the present modification example will be described with reference to FIG. 22. After start process d201 of block decoding, process d202 is to input encoded data corresponding to a next block to be decoded. Process d203 is to perform entropy decoding of the encoded data to acquire the necessary condition for generation of the motion vector and the coding information of the error block. Process d204 is to detect the motion vector by use of the decoded image and template, as shown in FIG. 17, according to the condition. Process d205 is to acquire the predicted block corresponding to the motion vector from the decoded image. Process d206 is to decode the coding information of the error block (e.g., inverse quantization of quantization transformation coefficients and inverse discrete cosine transformation). Process d207 is to perform addition of the decoded error block and the predicted block to reconstruct the decoded block, and process d208 is to terminate the block decoding process.

In the case that the information associated with the motion vector, such as the reference frame, the prediction mode (unidirectional prediction or bidirectional prediction), or the generation method of the predicted block (method of generating one predicted block from two predicted blocks) in addition to the motion vector, is generated at decoding side, the necessary conditions for generation of these information are determined at the coding side and they are transmitted to the decoding side so that the generation performance of the information can be improved. They also contain conditions for modification of the information once generated.

What is claimed is:

1. An image decoding method comprising:
   a video data decoding step of receiving and decoding encoded video data to acquire a plurality of reconstructed images;
   a subsidiary data decoding step of receiving and decoding subsidiary data to acquire subsidiary motion information; and
   a resolution enhancing step of generating motion vectors representing time-space correspondences between the plurality of reconstructed images, based on the subsidiary motion information acquired in the subsidiary data decoding step, and generating a high-resolution image with a spatial resolution higher than that of the plurality of reconstructed images, using the generated motion vectors and the plurality of reconstructed images acquired in the video data decoding step.

2. An image encoding method comprising:
   an image sampling step of converting a high-resolution image into low-resolution images;
   a video data encoding step of encoding the plurality of low-resolution images generated in the image sampling step, to generate encoded video data;
   a video data decoding step of decoding the encoded video data generated in the video data encoding step, to acquire reconstructed low-resolution images;
   a subsidiary motion information generating step of generating subsidiary motion information necessary for generation of motion vectors, using the high-resolution image or the low-resolution images;
   a resolution enhancing step of generating the motion vectors representing time-space correspondences between the plurality of reconstructed low-resolution images acquired in the video data decoding step, based on the subsidiary motion information generated in the subsidiary motion information generating step, and generating a reconstructed high-resolution image, using the generated motion vectors and the plurality of reconstructed low-resolution images; and
   a subsidiary data encoding step of encoding the subsidiary motion information generated in the subsidiary motion information generating step, as subsidiary data.

3. An image decoding method comprising:
   a coded data decoding step of receiving and entropy-decoding coded data to acquire a motion vector generation condition as a necessary condition for generation of motion vectors, and to acquire coding information indicating prediction error image signals;
   a motion vector generating step of generating the motion vectors based on decoded image signals stored in an image memory, on the basis of the motion vector generation condition acquired in the coded data decoding step;
   a predicted image signal generating step of generating predicted image signals, using the motion vectors generated in the motion vector generating step and the decoded image signals;
   a decoding step of decoding the coding information acquired in the coded data decoding step, to acquire the prediction error image signals; and
   a storing step of adding the predicted image signals generated in the predicted image signal generating step, to the prediction error image signals acquired in the decoding step, to reconstruct the decoded image signals, and storing the decoded image signals into the image memory.

4. An image encoding method comprising:
   an inputting step of inputting input image signals;
   a motion vector generation condition determining step of determining a motion vector generation condition as a necessary condition for generation of motion vectors, based on the input image signals inputted in the inputting step;
   a motion vector generating step of generating the motion vectors based on decoded image signals stored in an image memory, on the basis of the motion vector generation condition determined in the motion vector generation condition determining step;
   a predicted image signal generating step of generating predicted image signals, using the motion vectors generated in the motion vector generating step and the decoded image signals;
   a prediction error image signal generating step of generating prediction error image signals based on the input image signals inputted in the inputting step and the predicted image signals generated in the predicted image signal generating step;
   a coding information acquiring step of encoding the prediction error image signals generated in the prediction error image signal generating step, to acquire coding information;
   a local decoding step of decoding the coding information acquired in the coding information acquiring step, to acquire decoded prediction error image signals;
   a storing step of reconstructing the decoded image signals based on the predicted image signals generated in the predicted image signal generating step and the decoded prediction error image signals acquired in the local decoding step, and storing the decoded image signals into the image memory; and
   a coded data generating step of entropy-encoding the motion vector generation condition determined in the motion vector generation condition determining step and the coding information acquired in the coding information acquiring step, to generate coded data.

5. A computer readable medium contains an image decoding program which, when executed by a computer in an image decoding apparatus, causes the computer to implement a method comprising:
   a video data decoding step of receiving and decoding encoded video data to acquire a plurality of reconstructed images;
   a subsidiary data decoding step of receiving and decoding subsidiary data to acquire subsidiary motion information; and
   a resolution enhancing step of generating motion vectors representing time-space correspondences between the plurality of reconstructed images, based on the subsidiary motion information, and generating a high-resolution image with a spatial resolution higher than that of the plurality of reconstructed images, using the generated motion vectors and the plurality of reconstructed images.

6. A computer readable medium contains an image encoding program which, when executed by a computer in an image encoding apparatus, causes the computer to implement a method comprising:

an image sampling step of converting a high-resolution image into low-resolution images;
a video data encoding step of encoding the plurality of low-resolution images to generate encoded video data;
a video data decoding step of decoding the encoded video data to acquire reconstructed low-resolution images;
a subsidiary motion information generating step of generating subsidiary motion information necessary for generation of motion vectors, using the high-resolution image or the low-resolution images;
a resolution enhancing step of generating the motion vectors representing time-space correspondences between the plurality of reconstructed low-resolution images based on the subsidiary motion information and generating a reconstructed high-resolution image, using the generated motion vectors and the plurality of reconstructed low-resolution images; and
a subsidiary data encoding step of encoding the subsidiary motion information as subsidiary data.

7. A computer readable medium contains an image decoding program which, when executed by a computer in an image decoding apparatus, causes the computer to implement a method comprising:
a coded data decoding step of receiving and entropy-decoding coded data to acquire a motion vector generation condition as a necessary condition for generation of motion vectors, and to acquire coding information indicating prediction error image signals;
a motion vector generating step of generating the motion vectors based on decoded image signals stored in an image memory, on the basis of the motion vector generation condition;
a predicted image signal generating step of generating predicted image signals, using the motion vectors and the decoded image signals;
a decoding step of decoding the coding information to acquire the prediction error image signals; and
a storing step of adding the predicted image signals to the prediction error image signals to reconstruct the decoded image signals, and storing the decoded image signals into the image memory.

8. A computer readable medium contains an image encoding program which, when executed by a computer in an image encoding apparatus, causes the computer to implement a method comprising:
an inputting step of inputting input image signals;
a motion vector generation condition determining step of determining a motion vector generation condition as a necessary condition for generation of mo :ion vectors, based on the input image signals;
a motion vector generating step of generating the motion vectors based on decoded image signals stored in an image memory, on the basis of the motion vector generation condition;
a predicted image signal generating step of generating predicted image signals, using the motion vectors and the decoded image signals;
a prediction error image signal generating step of generating prediction error image signals based on the input image signals and the predicted image signals;
a coding information acquiring step of encoding the prediction error image signals, to acquire coding information;
a local decoding step of decoding the coding information to acquire decoded prediction error image signals;
a storing step of reconstructing the decoded image signals based on the predicted image signals and the decoded prediction error image signals, and storing the decoded image signals into the image memory; and
a coded data generating step of entropy-encoding the motion vector generation condition and the coding information to generate coded data.

9. An image decoding apparatus comprising:
coded data decoding means for receiving and entropy-decoding coded data to acquire a motion vector generation condition as a necessary condition for generation of motion vectors, a differential motion vector, and coding information indicating prediction error image signals;
an image memory for storing decoded image signals;
motion vector generating means for generating the first motion vectors based on the decoded image signals stored in the image memory, on the basis of the motion vector generation condition acquired by the coded data decoding means;
motion vector decoding means for decoding a second motion vector by adding the differential motion vector acquired by the coded data decoding means to a first motion vector generated by the motion vector generating means;
predicted image signal generating means for generating predicted image signals, using second motion vectors generated by the motion vector decoding means and the decoded image signals;
decoding means for decoding the coding information acquired by the coded data decoding means, to acquire the prediction error image signals; and
storing means for adding the predicted image signals generated by the predicted image signal generating means, to the prediction error image signals acquired by the decoding means, to reconstruct the decoded image signals, and for storing the decoded image signals into the image memory.

10. An image decoding apparatus comprising:
coded data decoding means for receiving and entropy-decoding coded data to acquire a differential motion vector, and coding information indicating prediction error image signals;
an image memory for storing decoded image signals;
motion vector generating means for generating first motion vectors based on the decoded image signals stored in the image memory;
motion vector decoding means for decoding a second motion vector by adding the differential motion vector acquired by the coded data decoding means to a first motion vector generated by the motion vector generating means;
predicted image signal generating means for generating predicted image signals, using second motion vectors generated by the motion vector decoding means and the decoded image signals;
decoding means for decoding the coding information acquired by the coded data decoding means, to acquire the prediction error image signals; and
storing means for adding the predicted image signals generated by the predicted image signal generating means, to the prediction error image signals acquired by the decoding means, to reconstruct the decoded image signals, and for storing the decoded image signals into the image memory.

* * * * *